(12) United States Patent
Kubo et al.

(10) Patent No.: US 6,710,825 B2
(45) Date of Patent: Mar. 23, 2004

(54) LCD INCLUDING PIXEL ELECTRODE WITH MULTIPLE SUB-ELECTRODE PORTIONS

(75) Inventors: Masumi Kubo, Nara (JP); Akihiro Yamamoto, Nara (JP); Takashi Ochi, Nara (JP); Kiyoshi Ogishima, Kyoto (JP); Kazuhiro Maekawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/919,839

(22) Filed: Aug. 2, 2001

(65) Prior Publication Data

US 2002/0036744 A1 Mar. 28, 2002

(30) Foreign Application Priority Data

Aug. 11, 2000 (JP) .......................... 2000-244648
May 31, 2001 (JP) .......................... 2001-164676

(51) Int. Cl.$^7$ .................. G02F 1/136; G02F 1/1343; G02F 1/13
(52) U.S. Cl. .................. 349/48; 349/143; 349/144; 349/192
(58) Field of Search .................. 349/143, 144, 349/193, 48

(56) References Cited

U.S. PATENT DOCUMENTS

| | | | | |
|---|---|---|---|---|
| 4,368,523 A | * | 1/1983 | Kawate ........................ 365/63 |
| 5,132,819 A | * | 7/1992 | Noriyama et al. ............ 349/55 |
| 5,164,851 A | * | 11/1992 | Kanemori et al. ............ 349/55 |
| 5,182,664 A | | 1/1993 | Clerc .......................... 359/93 |
| 5,260,818 A | * | 11/1993 | Wu .............................. 349/55 |
| 5,331,447 A | * | 7/1994 | Someya et al. ............... 349/54 |
| 5,363,294 A | | 11/1994 | Yamamoto et al. .......... 362/330 |
| 5,477,358 A | | 12/1995 | Rosenblatt et al. ........... 359/77 |
| 5,558,927 A | | 9/1996 | Aruga et al. ................. 428/195 |
| 5,602,662 A | | 2/1997 | Rosenblatt et al. ......... 349/130 |
| 5,636,043 A | | 6/1997 | Uemura et al. ................ 359/81 |
| 5,646,702 A | * | 7/1997 | Akinwande et al. .......... 349/69 |
| 5,668,651 A | | 9/1997 | Yamada et al. .............. 349/156 |
| 5,726,728 A | | 3/1998 | Kondo et al. ................ 349/156 |
| 5,748,276 A | * | 5/1998 | Uno et al. ................... 349/144 |
| 6,061,117 A | | 5/2000 | Horie et al. ................. 349/156 |
| 6,141,077 A | | 10/2000 | Hirata et al. ................ 349/143 |
| 6,222,599 B1 | | 4/2001 | Yoshida et al. ............. 349/106 |
| 6,266,122 B1 | | 7/2001 | Kishimoto et al. ......... 349/156 |
| 6,335,780 B1 | | 1/2002 | Kurihara et al. ............ 349/156 |
| 6,339,462 B1 | | 1/2002 | Kishimoto et al. ......... 349/156 |
| 6,340,998 B1 | * | 1/2002 | Kim et al. ..................... 349/48 |
| 6,384,887 B1 | | 5/2002 | Yasuda et al. .............. 349/129 |
| 6,384,889 B1 | | 5/2002 | Miyachi et al. ............. 349/143 |
| 6,512,564 B1 | | 1/2003 | Yoshida et al. ............. 349/124 |
| 6,542,212 B2 | | 4/2003 | Yoshida et al. ............. 349/141 |
| 2002/0036740 A1 | | 3/2002 | Kubo et al. ................. 349/129 |

FOREIGN PATENT DOCUMENTS

| | | | |
|---|---|---|---|
| JP | | 6-301036 | 10/1994 |
| JP | | 11-109417 A | * 4/1999 |
| JP | | 2000-47217 | 2/2000 |

* cited by examiner

*Primary Examiner*—Tarifur R. Chowdhury
(74) *Attorney, Agent, or Firm*—Nixon & Vanderhye P.C.

(57) ABSTRACT

The liquid crystal display device of this invention includes a first substrate, a second substrate, a liquid crystal layer disposed between the first substrate and the second substrate and a plurality of picture element regions for producing a display. In each of the plurality of picture element regions, a picture element electrode provided on the face of the first substrate facing the liquid crystal layer and a switching element electrically connected to the picture element electrode are provided. The picture element electrode includes a plurality of sub-picture element electrodes and a plurality of contact portions for mutually electrically connecting at least some of the plurality of sub-picture element electrodes. At least one of the plurality of sub-picture element electrodes is electrically connected to the switching element via a plurality of connection paths.

26 Claims, 22 Drawing Sheets

(a) s=2.75 μm
(b) s=2.25 μm

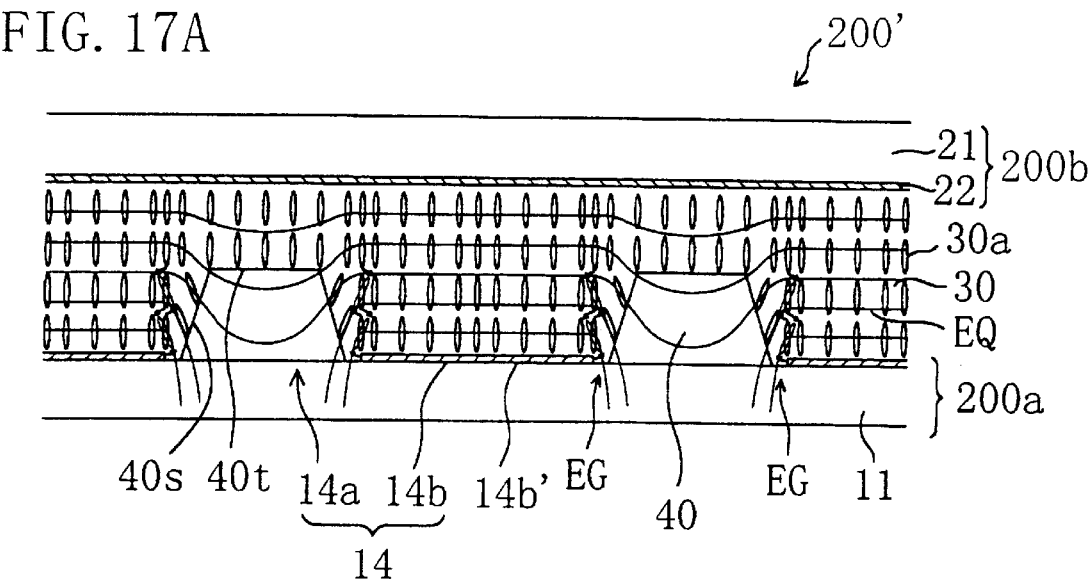
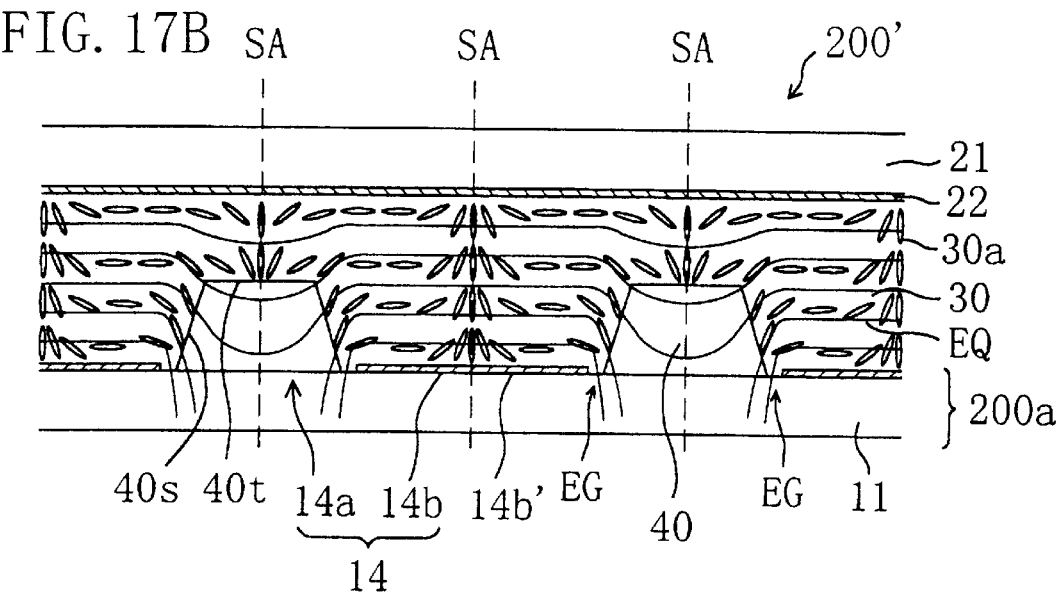

LCD INCLUDING PIXEL ELECTRODE WITH MULTIPLE SUB-ELECTRODE PORTIONS

BACKGROUND OF THE INVENTION

The present invention relates to a liquid crystal display device and a defect repairing method for the same.

Recently, liquid crystal display devices have been practically used in the fields of OA equipment and AV equipment owing to their advantages in compactness, small weight and size and small consumption power. In particular, an active matrix liquid crystal display device including a switching element (active device) in each picture element is capable of producing a fine dynamic display and hence is used as a display for a variety of equipment.

In an active matrix liquid crystal display device, picture elements are composed of picture element electrodes provided in the form of a matrix, a counter electrode opposing the picture element electrodes and a liquid crystal layer disposed therebetween. Each of a plurality of picture elements is controlled in its display state in accordance with an electric signal supplied through the switching element.

In an active matrix liquid crystal display device, short-circuit may be caused between the picture element electrode and the counter electrode or the like due to a conducting debris mixed in the liquid crystal layer. A normal voltage cannot be applied to a picture element in which the short-circuit through the picture element electrode is caused, resulting in a display defect that desired display cannot be obtained.

As a method for repairing a display defect, Japanese Laid-Open Patent Publication No. 4-178622 discloses a defect repairing method in which a photoresist including a black pigment is applied on the face of a glass substrate and a shield film is formed by exposing and curing a portion of the photoresist positioned on merely a picture element suffering from a display defect, so as to change a bright defect into an opaque point (dark defect). An dark defect is less visually recognized than a bright defect and hence merely slightly affects the display quality.

The present inventors have, however, found that a display defect cannot be effectively repaired by the defect repairing method disclosed in Japanese Laid-Open Patent Publication No. 4-178622.

In the defect repairing method of Japanese Laid-Open Patent Publication No. 4-178622, the entire picture element suffering from a bright defect is covered with a shield film formed so as to change the entire picture element into an opaque point, and therefore, the entire picture element having the display defect cannot make contribution to the display.

SUMMARY OF THE INVENTION

The present invention was devised in consideration of the aforementioned conventional problem, and an object is providing a liquid crystal display device capable of repairing a display defect without sacrificing an entire picture element having the display defect and providing a defect repairing method employed in the liquid crystal display device.

The object is achieved by first and second liquid crystal display devices and defect repairing methods for these devices described below.

The first liquid crystal display device of this invention includes a first substrate; a second substrate; a liquid crystal layer disposed between the first substrate and the second substrate; a plurality of picture element regions for producing a display; and in each of the plurality of picture element regions, a picture element electrode provided on a face of the first substrate facing the liquid crystal layer and a switching element electrically connected to the picture element electrode, and the picture element electrode includes a plurality of sub-picture element electrodes and a plurality of contact portions each for mutually electrically connecting at least some of the sub-picture element electrodes, and at least one of the plurality of sub-picture element electrodes is electrically connected to the switching element via a plurality of connection paths. Thus, the aforementioned object can be achieved.

The first liquid crystal display device preferably further includes a counter electrode provided on the second substrate and opposing the picture element electrode with the liquid crystal layer sandwiched therebetween, and preferably, the picture element electrode is composed of a solid portion including the plurality of sub-picture element electrodes and the plurality of contact portions, and a plurality of openings, and in each of the plurality of picture element regions, the liquid crystal layer is formed into a plurality of liquid crystal domains each in a radially-inclined orientation state correspondingly to the plurality of openings and the solid portion by inclined electric fields generated at respective edge portions of the plurality of openings of the picture element electrode when a voltage is applied between the picture element electrode and the counter electrode, whereby producing a display by changing orientation states of the plurality of liquid crystal domains in accordance with the applied voltage.

Preferably, at least some of the plurality of openings have substantially the same shape and the same size, and form at least one unit lattice arranged so as to have rotational symmetry.

Preferably, each of the at least some of the plurality of openings is in a rotationally symmetrical shape.

Alternatively, each of the at least some of the plurality of openings may be in a substantially circular shape.

Each region of the solid portion surrounded with the at least some of the plurality of openings may be in a substantially circular shape.

Preferably, in each of the plurality of picture element regions, a total area of the plurality of openings of the picture element electrode is smaller than an area of the solid portion of the picture element electrode.

The liquid crystal display device preferably further includes a protrusion within each of the plurality of openings, and preferably, a cross-sectional shape of the protrusion taken in a plane direction of the substrate is the same as a shape of the corresponding opening, and a side face of the protrusion has orientation-regulating force for orienting liquid crystal molecules of the liquid crystal layer in the same direction as an orientation-regulating direction obtained by the inclined electric field.

In the first defect repairing method for a liquid crystal display device of this invention, the liquid crystal display device includes a first substrate; a second substrate; a liquid crystal layer disposed between the first substrate and the second substrate; a plurality of picture element regions for producing a display; and in each of the plurality of picture element regions, a picture element electrode provided on a face of the first substrate facing the liquid crystal layer and a switching element electrically connected to the picture element electrode, the picture element electrode being composed of a plurality of sub-picture element electrodes and a plurality of contact portions for mutually electrically connecting at least some of the plurality of sub-picture element electrodes, and at least one of the plurality of sub-picture element electrodes being electrically connected to the switching element via a plurality of connection paths, and the defect repairing method includes the steps of specifying a picture element region having a display defect among the plurality of picture element regions and specifying a sub-picture element electrode suffering from short-circuit among the plurality of sub-picture element electrodes in the specified picture element region; and electrically disconnecting the specified sub-picture element electrode from the switching element with keeping electrical connection between the at least one of the plurality of sub-picture element electrodes and the switching element by cutting off a contact portion connected to the specified sub-picture element electrode among the plurality of contact portions. Thus, the aforementioned object can be achieved.

The second liquid crystal display device of this invention includes a first substrate; a second substrate; a liquid crystal layer disposed between the first substrate and the second substrate; a plurality of picture element regions for producing a display; and in each of the plurality of picture element regions, a picture element electrode provided on a face of the first substrate facing the liquid crystal layer and a switching element electrically connected to the picture element electrode, and the picture element electrode includes a plurality of sub-picture element electrodes electrically connected to the switching element in parallel. Thus, the aforementioned object can be achieved.

In the second defect repairing method for a liquid crystal display device of this invention, the liquid crystal display device includes a first substrate; a second substrate; a liquid crystal layer disposed between the first substrate and the second substrate; a plurality of picture element regions for producing a display; and in each of the plurality of picture element regions, a picture element electrode provided on a face of the first substrate facing the liquid crystal layer and a switching element electrically connected to the picture element electrode, and the picture element electrode including a plurality of sub-picture element electrodes electrically connected to the switching element in parallel, and the defect repairing method includes the steps of specifying a picture element region having a display defect among the plurality of picture element regions and specifying a sub-picture element electrode suffering from short-circuit among the plurality of sub-picture element electrodes in the specified picture element region; and electrically disconnecting the specified sub-picture element electrode from the switching element with keeping electrical connection between the plurality of sub-picture element electrodes other than the specified sub-picture element electrode and the switching element. Thus, the aforementioned object can be achieved.

The functions of the present invention are as follows:

In the first liquid crystal display device of this invention, at least one of the plurality of sub-picture element electrodes is electrically connected to the switching element via a plurality of connection paths. At this point, a connection path for electrically connecting the sub-picture element electrode to the switching element includes any of the other sub-picture element electrodes and the contact portions. Accordingly, in the case where a short-circuit defect is caused in a sub-picture element electrode included in one connection path among the plurality of connection paths for connecting a given sub-picture element electrode to the switching element, the sub-picture element electrode having the short-circuit defect can be electrically disconnected from the switching element with keeping the electrical connection between the given sub-picture element electrode and the switching element by cutting off a contact portion. Therefore, a voltage can be normally applied to the given sub-picture element electrode through the switching element, resulting in attaining sufficient display quality.

Also, in a preferred embodiment of the liquid crystal display device of this invention, the picture element electrode is composed of a solid portion (a region of the picture element electrode other than openings where a conducting film is present) including a plurality of sub-picture element electrodes and a plurality of contact portions, and a plurality of openings (a region of the picture element electrode where no conducting film is present). The solid portion is typically formed from a continuous conducting film. The liquid crystal layer is in a vertical orientation state when no voltage is applied, and is formed into a plurality of liquid crystal domains each in a radially-inclined orientation state owing to inclined electric fields generated at the edge portions of the openings of the electrode when a voltage is applied. Typically, the liquid crystal layer is made from a liquid crystal material having negative dielectric anisotropy and is controlled in its orientation by vertical alignment layers sandwiching the liquid crystal layer.

The liquid crystal domains formed by the inclined electric fields are respectively formed in regions corresponding to the openings and the solid portion of the electrode, and a display is produced by changing the orientation states of the liquid crystal domains in accordance with the applied voltage. Since each of the liquid crystal domains is in an axially symmetrical orientation, the viewing angle dependency of display quality is reduced, resulting in attaining a wide viewing angle characteristic.

Furthermore, since the liquid crystal domain corresponding to the opening and the liquid crystal domain corresponding to the solid portion are formed owing to the inclined electric fields generated at the edge portions of the openings, these liquid crystal domains are formed adjacently and alternately, and the orientations of liquid crystal molecules of the adjacent liquid crystal domains are substantially continuous. Accordingly, no disclination line is formed between the liquid crystal domain corresponding to the opening and the liquid crystal domain corresponding to the solid portion, the display quality can be prevented from lowing due to a disclination line, and the orientation of the liquid crystal molecules is highly stable.

In this liquid crystal display device, the liquid crystal molecules are placed in the radially-inclined orientation state not only in the region corresponding to the solid portion of the electrode but also in the region corresponding to the opening. Therefore, the orientation of the liquid crystal molecules is highly continuous and a stable orientation state can be realized, resulting in displaying an even display free from unevenness. In particular, it is necessary to apply the inclined electric field for controlling the orientation of the liquid crystal molecules to a large number of liquid crystal molecules for realizing a good response characteristic (a high response speed), and for this purpose, it is necessary to form a large number of openings (edge portions). In the liquid crystal display device of this invention, since the liquid crystal domains having the stable radially-inclined orientation are formed correspondingly to the openings, and hence, even when a large number of openings are formed for improving the response characteristic, the lowering of the display quality (occurrence of unevenness) derived from the increased number of openings can be avoided.

When at least some of the plurality of openings are formed in substantially the same shape and the same size so as to form at least one unit lattice arranged to have rotational symmetry, the plurality of liquid crystal domains can be highly symmetrically arranged by using the unit lattice as a unit, resulting in improving the viewing angle dependency of the display quality. Furthermore, when the entire picture element region is divided into unit lattices, the orientation of the liquid crystal layer can be stabilized over the entire picture element region. For example, the openings are arranged so that the centers of the respective openings can form a square lattice. In the case where one picture element region is divided by an opaque composing element such as an storage capacitance line, the unit lattices are arranged at least in each region distributing the display.

When each of at least some of the plurality of openings (typically, the openings forming a unit lattice) is formed in a rotationally symmetrical shape, the radially-inclined orientation of the liquid crystal domain formed correspondingly to the opening can be stabilized. For example, each of the openings is formed in the shape (seen from the substrate normal direction) of a circle or regular polygon (such as a square). The opening may be in a shape not rotationally symmetrical (such as an ellipse) depending upon the shape (the ratio between the width and the length) of the picture element. Furthermore, when a region of the solid portion substantially surrounded with the openings ("a unit solid portion" described below) is in a rotationally symmetrical shape, the stability of the radially-inclined orientation of the liquid crystal domain formed correspondingly to the solid portion can be improved. For example, in the case where the openings are disposed in a square lattice arrangement, the opening may be formed in a substantially star-shape or cross-shape with the unit solid portion formed in a substantially circular shape or substantially square shape. Needless to say, the opening and the region of the solid portion substantially surrounded with the openings may be both formed in a substantially square shape.

In order to stabilize the radially-inclined orientation of the liquid crystal domain formed correspondingly to the opening of the electrode, the liquid crystal domain corresponding to the opening is preferably formed in a substantially circular shape. Conversely speaking, the shape of the opening is designed so that the liquid crystal domain corresponding to the opening can be formed in a substantially circular shape.

Needless to say, in order to stabilize the radially-inclined orientation of the liquid crystal domain corresponding to the solid portion of the electrode, the region of the solid portion substantially surrounded with the openings is preferably formed in a substantially circular shape. One liquid crystal domain formed in the solid portion made from a continuous conducting film is formed correspondingly to the region of the solid portion substantially surrounded with the plural openings (unit solid portion). Accordingly, the shape and the arrangement of the openings are determined so that the region of the solid portion (unit solid portion) can be formed in a substantially circular shape.

In any of the aforementioned cases, the total area of the openings formed in the electrode is preferably smaller than the area of the solid portion in each picture element region. As the area of the solid portion is larger, the area (defined on a plane seen from the substrate normal direction) of a region of the liquid crystal layer directly affected by the electric fields generated by the electrodes is larger. Therefore, the optical characteristic (such as transmittance) of the liquid crystal layer against voltage can be improved.

It is preferably determined whether the opening is formed in a substantially circular shape or the unit solid portion is formed in a substantially circular shape depending upon in which structure the area of the solid portion can be larger. It is appropriately selected which structure is preferred depending upon the pitch of picture elements. Typically, in the case where the pitch exceeds approximately 25 $\mu$m, the openings are preferably formed so as to form substantially circular unit solid portions, and in the case where the pitch is smaller than approximately 25 $\mu$m, the opening is preferably formed in a substantially circular shape.

The orientation-regulating force caused by the inclined electric fields generated at the edge portions of the openings of the electrode works merely under voltage application. Therefore, when, for example, an external force is applied to the liquid crystal panel under application of no voltage or a comparatively low voltage, the radially-inclined orientation of the liquid crystal domain sometimes cannot be kept. In order to overcome this problem, in one preferred embodiment, the liquid crystal display device includes a protrusion within the opening of the electrode and having an orientation-regulating force for orienting the liquid crystal molecules of the liquid crystal layer in the same direction as the orientation-regulating direction obtained by the inclined electric field. The cross-sectional shape of the protrusion taken in a plane direction of the substrate is the same as the opening, and is preferably in a rotationally symmetrical shape similarly to the shape of the opening.

In the aforementioned liquid crystal display device, merely by forming openings in the picture element electrode, stable radially-inclined orientation can be realized. Specifically, the present liquid crystal display device can be fabricated by a known fabrication method merely by modifying a photomask used in patterning a conducting film into a pattern of picture element electrodes so as to form openings in a desired shape in desired arrangement.

In the second liquid crystal display device of this invention, the plurality of sub-picture element electrodes are electrically connected to the switching element in parallel. Accordingly, in the case where short-circuit is caused between a given sub-picture element electrode and the counter electrode, merely the sub-picture element electrode suffering from the short-circuit defect can be electrically disconnected from the switching element with keeping the electrical connection between the other sub-picture element electrodes and the switching element. Therefore, a normal voltage is applied to the other sub-picture element electrodes through the switching element, resulting in obtaining sufficient display quality.

BRIEF DESCRIPTION OF THE DRAWINGS

FIGS. 17A and 17B are diagrams for showing states where a voltage is applied through a liquid crystal layer 30 of the liquid crystal display device 200', and specifically FIG. 17A schematically shows the state where orientation starts to change (ON initial state) and FIG. 17B schematically shows the stationary state;

DETAILED DESCRIPTION OF THE INVENTION

Figure 1:
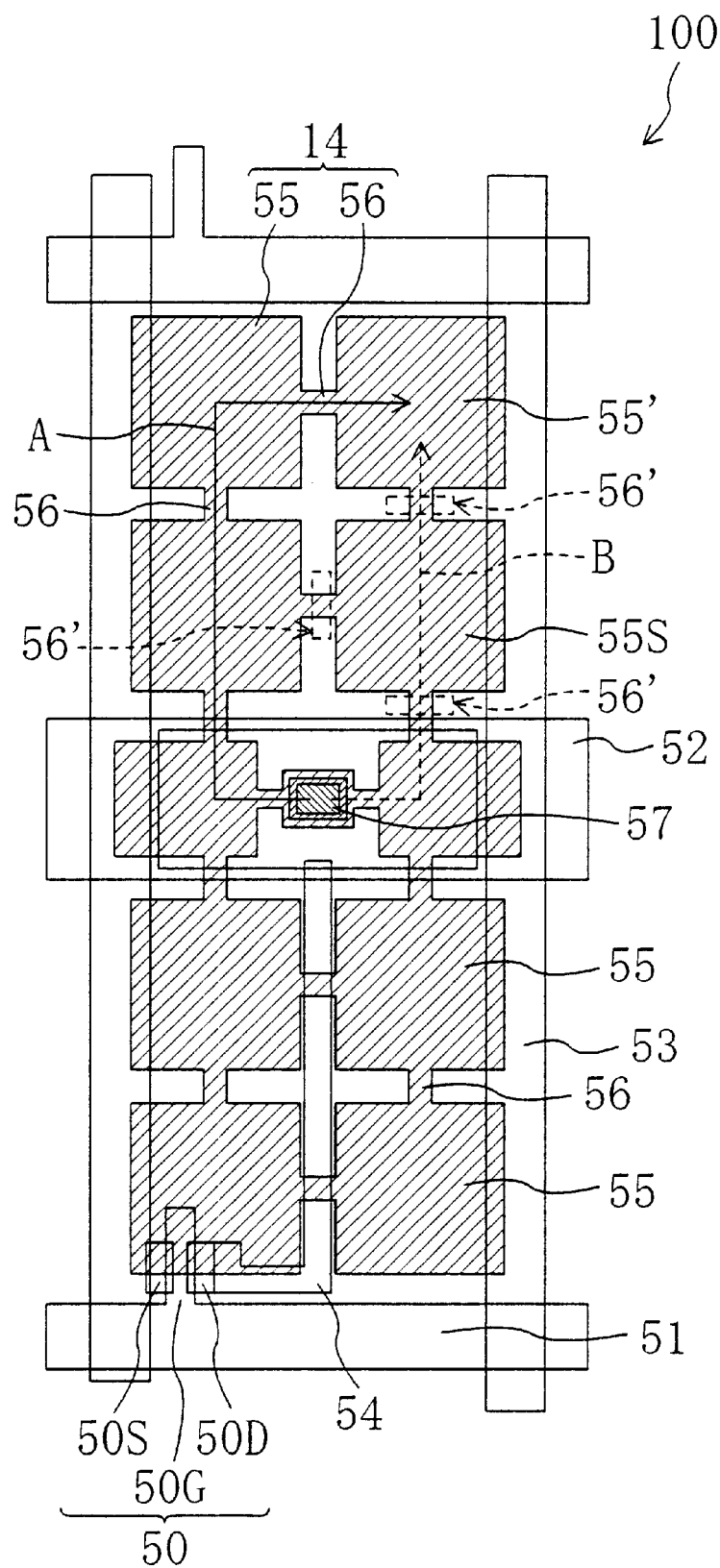
FIG. 1 is a top view for schematically showing the structure of one picture element region of a liquid crystal display device 100 according to Embodiment 1 of the invention.

Now, liquid crystal display devices according to preferred embodiments of the invention will be described. Herein, a region of a liquid crystal display device corresponding to a "picture element", that is, a minimum unit of display, is designated as a "picture element region". In a color liquid crystal display device, three picture elements of R, G and B together correspond to one pixel. A picture element region is defined by a picture element electrode and a counter electrode opposing the picture element electrode. In a structure employing a black matrix, strictly speaking, a region corresponding to an opening of the black matrix in the entire region to which a voltage is applied in accordance with a state to be displayed corresponds to a picture element region.

A liquid crystal display device of the invention includes a first substrate (such as a TFT substrate), a second substrate (such as a color filter substrate) and a liquid crystal layer disposed between these substrates, and further includes, in each picture element region, a picture element electrode provided on a face of the first substrate facing the liquid crystal layer and a switching element (active device) electrically connected to the picture element electrode.

The picture element electrode includes a plurality of sub-picture element electrodes and a plurality of contact portions for electrically connecting at least some of the plurality of sub-picture element electrodes to one another. The shape and the size of each sub-picture element electrode are appropriately determined in accordance with the display mode and the application of the liquid crystal display device. When the contact portions are formed from the same conducting film as that used for forming the sub-picture element electrodes, the structure of the liquid crystal display device can be simplified and the fabrication process can be prevented from being complicated.

At least one of the plurality of sub-picture element electrodes is electrically connected to the switching element via a plurality of electrical paths. A connection path for electrically connecting the sub-picture element electrode to the switching element is composed of any of the other sub-picture element electrodes and the contact portions. Accordingly, in the case where a short-circuit defect is caused in a sub-picture element electrode included in one connection path among the plurality of connection paths for connecting a given sub-picture element electrode to the switching element, the sub-picture element electrode having the short-circuit defect can be electrically disconnected from the switching element by cutting off the contact portion with keeping the electrical connection between the given sub-picture element electrode and the switching element. Therefore, a voltage can be normally applied to the given sub-picture element electrode through the switching element, and hence, sufficient display quality can be attained.

The plurality of sub-picture element electrodes present in one picture element region may include a sub-picture element electrode connected to the switching element via merely one connection path, but the ratio of sub-picture element electrodes connected to the switching element respectively via a plurality of connection paths is preferably large in all the sub-picture elements formed in the picture element region. A sub-picture element electrode connected via merely one connection path does not make contribution to display after repairing a defect because it is electrically disconnected from the switching element when any sub-picture element electrode included in the connection path is electrically disconnected from the switching element. When the ratio of sub-picture element electrodes respectively connected via the plurality of connection paths is large, the ratio of a region where a normal voltage is applied in the picture element region can be increased.

Furthermore, when sub-picture element electrodes having connection paths to the switching element including any of the other sub-picture element electrodes are all connected to the switching element respectively via a plurality of connection paths, merely a sub-picture element electrode suffering from short-circuit can be electrically disconnected from the switching element. Accordingly, since all the other sub-picture element electrodes excluding the sub-picture element electrode suffering from the short-circuit can make contribution to the display after repairing the defect, display with high quality can be realized.

The aforementioned structure and defect repairing method are useful in repairing a blinking point defect where the picture element electrode and the counter electrode are temporarily short-circuited or opened. Furthermore, when they are applied to a liquid crystal display device of the normally black mode, a region where a voltage is not normally applied in the picture element region after repairing becomes an opaque point (black point), which is difficult to visually recognize. Therefore, the effect of the defect repairing is further enhanced.

Also, a liquid crystal display device capable of repairing a display defect without sacrificing the entire picture element region can be obtained as follows:

Another liquid crystal display device of this invention includes a first substrate (such as a TFT substrate), a second substrate (such as a color filter substrate) and a liquid crystal layer disposed therebetween, and further includes, in each picture element region, a picture element electrode provided on a face of the first substrate facing the liquid crystal layer and a switching element electrically connected to the picture element electrode.

The picture element electrode includes a plurality of sub-picture element electrodes electrically connected to the switching element in parallel. Accordingly, in the case where short-circuit is caused between a given sub-picture element electrode and a counter electrode due to a conducting debris or the like, the sub-picture element electrode suffering from the short-circuit defect alone can be electrically disconnected from the switching element with keeping the electrical connection between the other sub-picture element electrodes and the switching element. Therefore, a voltage can be normally applied to the other sub-picture element electrodes through the switching element, and hence, sufficient display quality can be attained.

Now, liquid crystal display devices according to preferred embodiments of the invention will be described in more detail. In the following embodiments, a transmission type liquid crystal display device including a TFT (thin film transistor) as the switching element will be exemplified, which does not limit the invention. The invention is also applicable to a liquid crystal display device including a switching element apart from a TFT, a reflection type liquid crystal display device and a transmission/reflection type liquid crystal display device.

Embodiment 1

A liquid crystal display device 100 according to Embodiment 1 of the invention will now be described with reference to FIG. 1. FIG. 1 is a schematic top view of one picture element region of the liquid crystal display device 100 of this embodiment. FIG. 1 mainly shows the structure of a picture element electrode with part of the other composing elements omitted. The liquid crystal display device 100 includes an active matrix substrate, a counter substrate and a liquid crystal layer disposed therebetween.

The active matrix substrate includes a transparent substrate (such as a glass substrate), a picture element electrode 14 provided in each picture element region on the face of the transparent substrate facing the liquid crystal layer and a TFT (thin film transistor) 50 serving as a switching element electrically connected to the picture element electrode 14.

The counter substrate includes a transparent substrate (such as a glass substrate) and a counter electrode provided on the face thereof. The liquid crystal layer may be, for example, a liquid crystal layer capable of display in a polarization mode. In this embodiment, a liquid crystal layer capable of display in a TN mode is used.

The picture element electrode 14 and the counter electrode are disposed so as to oppose each other with the liquid crystal layer sandwiched therebetween, and the orientation state of the liquid crystal layer in each picture element region is changed in accordance with a voltage applied between the picture element electrode 14 and the counter electrode.

Referring to FIG. 1, the structure of the active matrix substrate of the liquid crystal display device 100 will be described in more detail.

The active matrix substrate includes the insulating substrate, on which a scanning line (gate bus line) 51, a gate electrode 50G branched from the scanning line 51 and an storage capacitance line 52 are formed. Furthermore, a gate insulating film is formed so as to cover them. A semiconductor layer, a channel protection layer, a source electrode 50S and a drain electrode 50D are formed on the gate insulating film above the gate electrode 50G, so as to form the TFT 50.

The source electrode 50S of the TFT 50 is electrically connected to a signal line (source bus line) 53 and the drain electrode 50D thereof is electrically connected to a connection line 54. An interlayer insulating film is formed so as to substantially cover the entire face of the insulating substrate where the TFT 50 is formed, and the picture element electrode 14 is formed on the interlayer insulating film.

The picture element electrode 14 includes a plurality of sub-picture element electrodes 55 and a plurality of contact portions 56 each for electrically connecting any two of the plurality of sub-picture element electrodes 55 to each other. The picture element electrode 14 is electrically connected to the connection line 54 through a contact hole 57 formed in the interlayer insulating film and is electrically connected to the drain electrode 50D through the connection line 54.

Although each of the sub-picture element electrodes of this embodiment is in the shape of a square, the shape of the sub-picture element electrode is not limited to the square but may be any optional shape including a rectangle and a circle. In a liquid crystal display device in which the orientation is not controlled by using an inclined electric field effect caused at the edge portion between a region where no conducting film is formed and the sub-picture element electrode as in the liquid crystal display device 100 including the TN mode liquid crystal layer of this embodiment, the ratio of a region where the conducting film is formed is preferably increased by forming each sub-picture element electrode in a rectangular shape from the viewpoint of realizing bright display. Also, the picture element electrode 14 of this embodiment includes ten sub-picture element electrodes 55, which does not limit the invention. The picture element electrode 14 may include an optional number of sub-picture element electrodes 55 and the sizes (areas) of the respective sub-picture element electrodes 55 may be different. Furthermore, the picture element electrode of this embodiment includes the contact portion for mutually connecting two sub-picture element electrodes, which does not limit the invention. The picture element electrode may include a contact portion for connecting three or more sub-picture element electrodes to one another.

Some of the sub-picture element electrodes 55 of the liquid crystal display device 100 of this embodiment are electrically connected to the TFT 50 respectively via a plurality of electrical connection paths. For example, a sub-picture element electrode 55' disposed in the upper right position in FIG. 1 is electrically connected to the TFT 50 not only via a connection path A schematically shown with a solid arrow but also via a connection path B schematically shown with a broken arrow. The connection paths A and B respectively include any of the other sub-picture element electrodes 55 and the contact portions 56.

Accordingly, in the case where a short-circuit defect is caused in a sub-picture element electrode 55s positioned below the sub-picture element electrode 55' in FIG. 1 and included in the connection path B, the contact portion 56 connected to the sub-picture element electrode 55s is cut off at a disconnection portion 56', so that the sub-picture element electrode 55s suffering from the short-circuit defect can be electrically disconnected from the TFT 50 with keeping the electrical connection between the sub-picture element electrode 55' and the TFT 50.

When the contact portion 56 connected to the sub-picture element electrode 55s is cut off, the connection path B stops functioning as a connection path for electrically connecting the sub-picture element electrode 55' to the TFT 50, but a normal voltage can be applied to the sub-picture element electrode 55' because it is electrically connected to the TFT 50 via the connection path A. Therefore, a region of the liquid crystal layer positioned above the sub-picture element electrode 55' can make contribution to the display in the liquid crystal display device 100 of this embodiment.

Furthermore, in the liquid crystal display device 100 of this embodiment, the picture element electrode 14 includes, in addition to the above-described sub-picture element electrode 55' disposed in the upper right position in the drawing, sub-picture element electrodes 55 connected to the TFT 50 respectively via a plurality of connection paths, and the sub-picture element electrodes 55 having the connection paths to the TFT 50 including any of the other sub-picture element electrodes 55 are all connected to the TFT 50 via a plurality of connection paths. Therefore, also in the case where a short-circuit defect is caused in any of the sub-picture element electrodes 55 present in the picture element region, merely the sub-picture element electrode 55 suffering from the short-circuit defect can be electrically disconnected from the TFT 50 with keeping the electrical connection between the other sub-picture element electrodes 55 and the TFT 50. Accordingly, after repairing the defect, all the sub-picture element electrodes except for the sub-picture element electrode 55s suffering from the short-circuit defect can make contribution to the display, resulting in realizing display with high quality.

Figure 2:
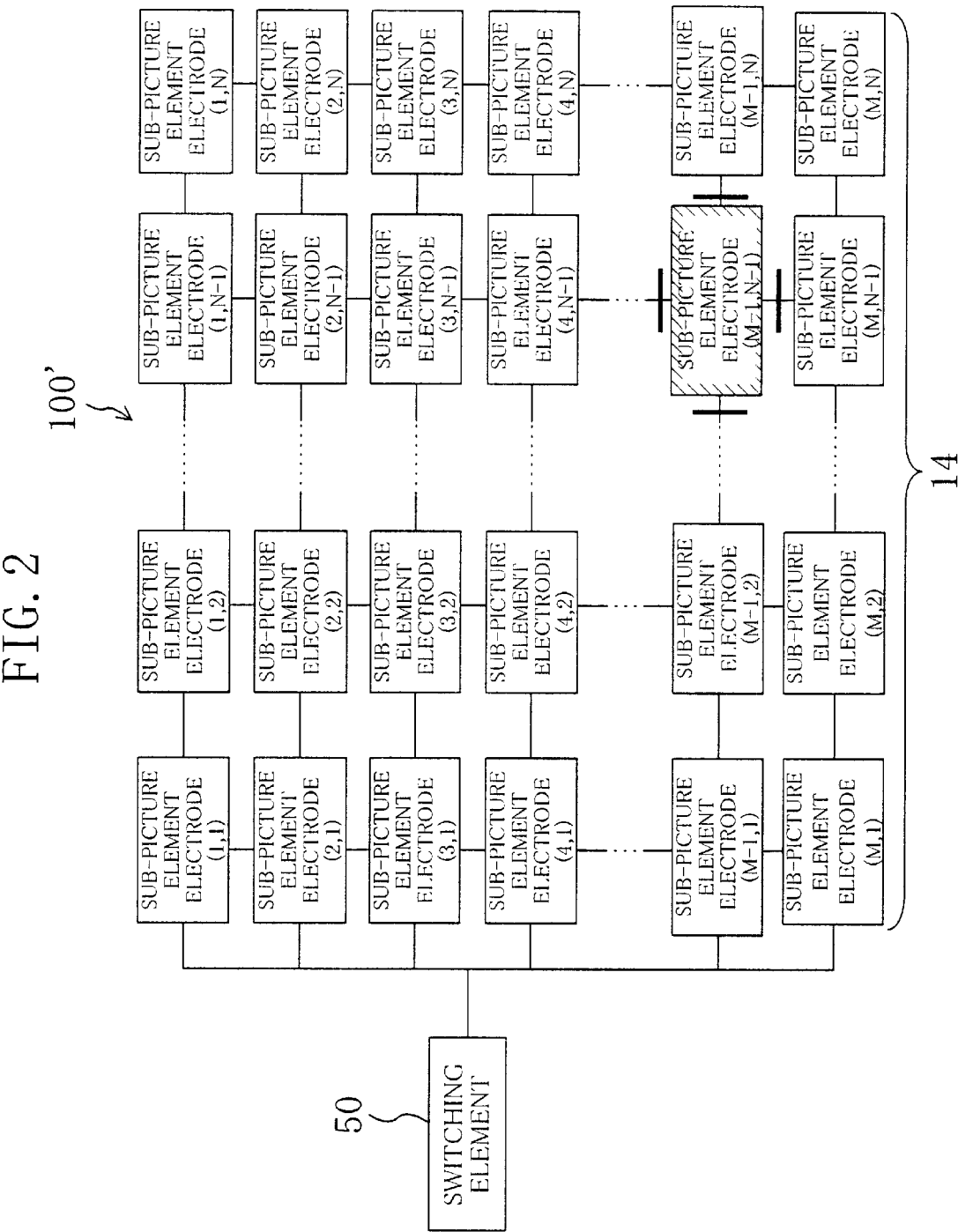
FIG. 2 is a conceptual diagram of a liquid crystal display device 100' including a plurality of sub-picture element electrodes arranged in an M×N matrix and capable of electrically disconnecting merely a sub-picture element electrode having short-circuit from a switching element.

Now, with reference to FIG. 2, an example of the structure of a liquid crystal display device capable of electrically disconnecting merely a sub-picture element electrode suffering from a short-circuit defect from a switching element as in the liquid crystal display device 100 of Embodiment 1 will be described. FIG. 2 is a conceptual diagram of a liquid crystal display device 100' including a plurality of sub-picture element electrodes arranged in an M×N matrix.

A picture element electrode 14 of the liquid crystal display device 100' includes a plurality of sub-picture element electrodes electrically connected to a switching element 50 and arranged in an M×N matrix (wherein a sub-picture element electrode disposed on the mth row and in the nth column is expressed as a sub-picture element electrode (m, n)). In FIG. 2, a solid line extending between the switching element and a sub-picture element electrode or between sub-picture element electrodes denotes that they are electrically connected to each other.

As shown in FIG. 2, in the liquid crystal display device 100', sub-picture element electrodes having connection paths to the switching element 50 including any of the other sub-picture element electrodes (in this case, the sub-picture element electrodes disposed in the second and following columns) are all connected to the switching element 50 respectively via a plurality of connection paths. Therefore, in the case where a short-circuit defect is caused in any of the sub-picture element electrodes, merely the sub-picture element electrode suffering from the short-circuit defect can be electrically disconnected from the switching element 50 with keeping the electrical connection between the other sub-picture element electrodes and the switching element 50.

For example, in the case where short-circuit is caused in a hatched sub-picture element electrode (M−1, N−1) disposed on the (M−1)th row and in the (N−1)th column in FIG. 2, the sub-picture element electrode (M−1, N−1) alone can be electrically disconnected from the switching element 50 by disconnecting the electrical connection between the sub-picture element electrode (M−1, N−1) and the switching element 50. Accordingly, after the repairing, all the other sub-picture element electrodes can make contribution to the display, resulting in realizing display with high quality.

The liquid crystal display device 100 of this embodiment can be fabricated by any of the know fabrication methods, for example, as follows:

First, an active matrix substrate is fabricated by forming a scanning line 51, a signal line 53, a TFT 50 serving as the switching element, a picture element electrode 14 and the like on a transparent substrate (such as a glass substrate) and covering these elements with a polyimide alignment layer (such as AL-4552 manufactured by JSR).

A counter substrate is fabricated by forming a color filter layer, a counter electrode and the like on a transparent substrate (such as a glass substrate) and covering these elements with a polyimide alignment layer (such as AL-4552 manufactured by JSR).

At this point, the polyimide alignment layers formed on the respective substrates are subjected to a rubbing treatment with the rubbing directions set to cross each other at an angle of 90 degrees when the substrates are adhered to each other.

On one of the active matrix substrate and the counter substrate, a seal pattern (sealing agent) is printed. Also, on the other substrate, a spacer (spherical spacer with a diameter of approximately 5 μm in this case) is sprayed. Then, the substrates are adhered to each other under pressure and the sealing agent is cured.

Subsequently, a nematic liquid crystal material having positive dielectric anisotropy (such as ZLI-4792 manufactured by Merck & Co., Inc.) including a chiral agent is injected into a gap between the active matrix substrate and the counter substrate by vacuum injection, and the injection port is sealed.

Thereafter, a phase plate and a polarizing plate are provided, so as to complete the liquid crystal display device 100 of this embodiment.

The defect repairing in the liquid crystal display device 100 thus fabricated is specifically carried out, for example, as follows:

First, a picture element region having a display defect is specified among a plurality of picture element regions, and in the specified picture element region, a sub-picture element electrode 55s suffering from short-circuit is specified among a plurality of sub-picture element electrodes 55. The specification of the picture element region and the sub-picture element electrode 55s is executed by using, for example, an optical microscope or a magnifying lens.

Next, the specified sub-picture element electrode 55s is electrically disconnected from a TFT 50 by cutting off a contact portion 56. The contact portion 56 is cut off by, for example, irradiating with a laser beam. The cutting by using a laser beam can be appropriately executed by known technique.

Embodiment 2

A liquid crystal display device 200 according to Embodiment 2 of the invention will now be described with reference to FIG. 3. The liquid crystal display device 100 of Embodiment 1 displays an image in the TN mode, and in contrast, in the liquid crystal display device 200 of Embodiment 2, the liquid crystal layer is in a vertical orientation state when no voltage is applied and in a radially-inclined orientation state when a voltage is applied. In drawings referred to below, like reference numerals are used to refer to like elements having substantially the same functions as those of the liquid crystal display device 100 so as to omit the description.

Figure 3:
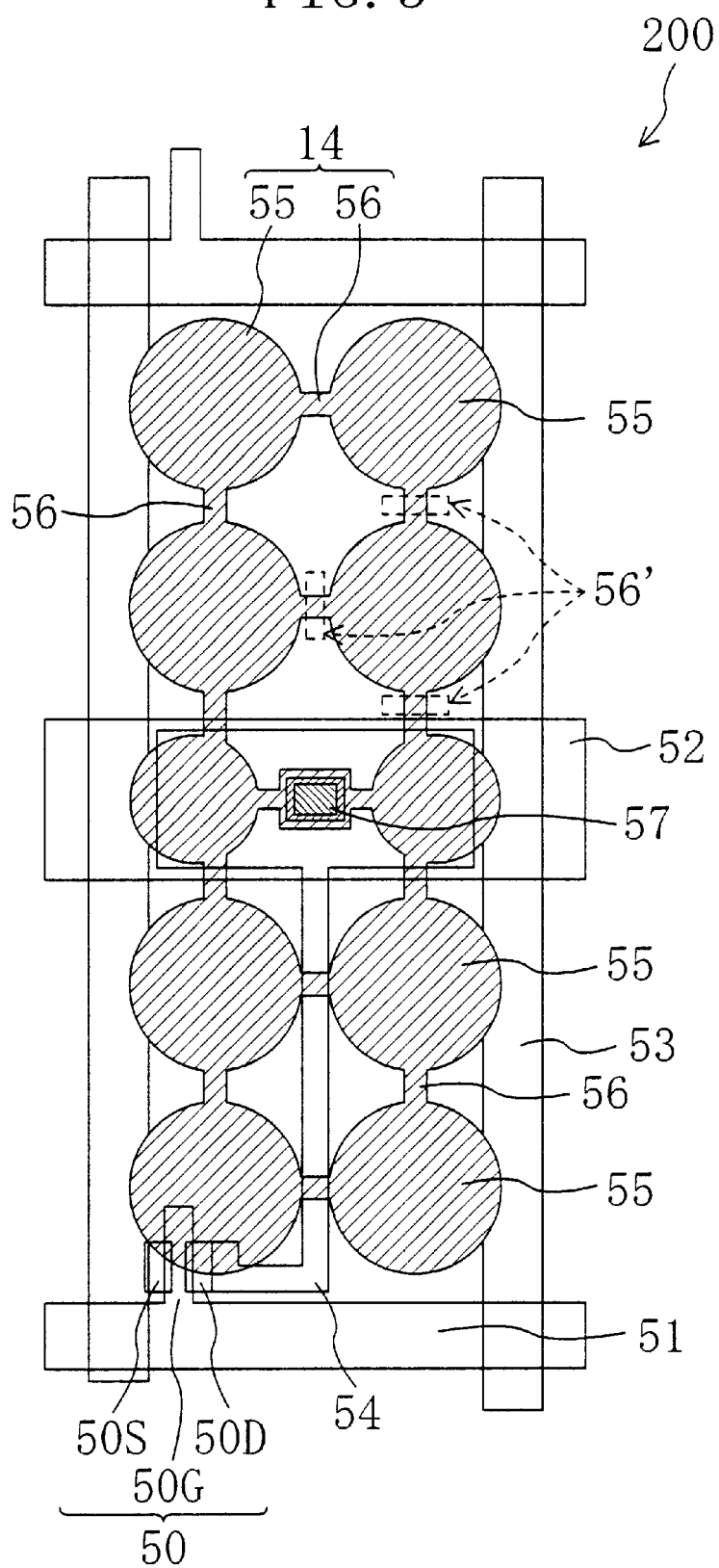
FIG. 3 is a top view for schematically showing one picture element region of a liquid crystal display device 200 according to Embodiment 2 of the invention.

FIG. 3 is a top view for schematically showing one picture element region of the liquid crystal display device 200 of this embodiment. A picture element electrode 14 of the liquid crystal display device 200 includes a plurality of sub-picture element electrodes 55 and a plurality of contact portions 56 each for electrically connecting any two of the plurality of sub-picture element electrodes 55 to each other.

Also in the liquid crystal display device 200, sub-picture element electrodes 55 having connection paths to a TFT 50 including any of the other sub-picture element electrodes 55 are all connected to the TFT 50 respectively via a plurality of connection paths. Therefore, in the case where a short-circuit defect is caused in any of the sub-picture element electrodes 55 present in the picture element region, merely the sub-picture element electrode 55 suffering from the short-circuit defect can be electrically disconnected from the TFT 50 with keeping the electrical connection between the other sub-picture element electrodes 55 and the TFT 50. Accordingly, after the repairing, all the sub-picture element electrodes 55 except for the sub-picture element electrode suffering from the short-circuit defect can make contribution to display, resulting in realizing display with high quality.

Also in the liquid crystal display device 200 of Embodiment 2, owing to this electrode structure, the liquid crystal layer is formed into liquid crystal domains that are placed in the radially-inclined orientation state under voltage application, and hence, a wide viewing angle characteristic can be attained. Furthermore, as described below, a liquid crystal domain is formed also in an opening (where no conducting film is formed) of the picture element electrode 14.

The electrode structure and its function of the liquid crystal display device 200 of Embodiment 2 will now be described.

Figure 4A:
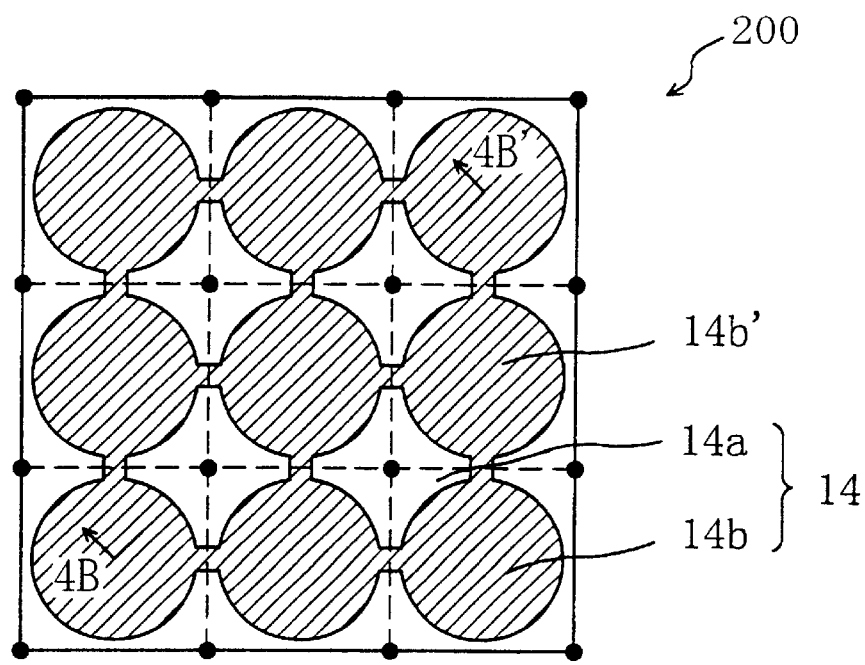
FIG. 4A is a top view for schematically showing the structure of one picture element region of the liquid crystal display device 200 of Embodiment 2 and FIG. 4B is a cross-sectional view taken along line 4B–4B' of FIG. 4A.
Figure 4B:
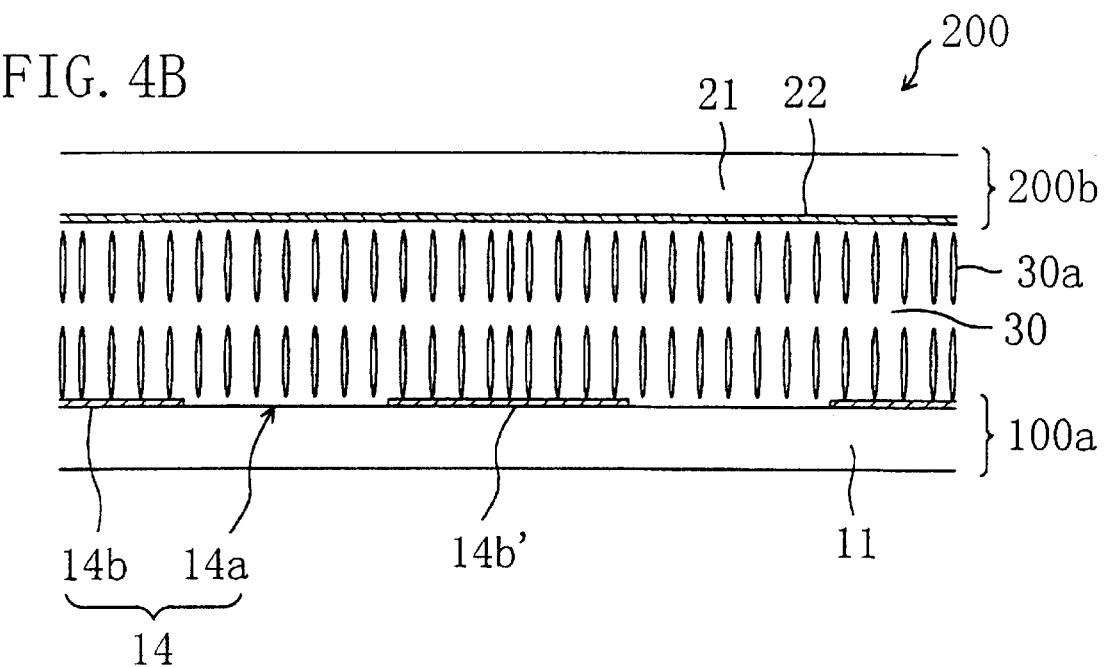

The structure of one picture element region of the liquid crystal display device 200 of Embodiment 2 will be described with reference to FIGS. 4A and 4B. In the following description, a color filter and a black matrix are omitted for simplification. Although sub-picture element electrodes 55 arranged in a 5×2 matrix are formed in one picture element region in FIG. 3, the sub-picture element electrodes 55 arranged in a 3×3 matrix in one picture element region are shown in the drawings referred to below for simplification. FIG. 4A is a top view seen from the substrate normal direction and FIG. 4B is a cross-sectional view taken along line 4B–4B' of FIG. 4A. FIG. 4B shows a state where no voltage is applied through the liquid crystal layer.

The liquid crystal display device 200 includes an active matrix substrate (hereinafter referred to as the TFT substrate) 200a, a counter substrate (also designated as a color filter substrate) 200b and a liquid crystal layer 30 disposed between the TFT substrate 200a and the counter substrate 200b. Liquid crystal molecules 30a of the liquid crystal layer 30 have negative dielectric anisotropy, and owing to vertical alignment layers (not shown) provided on the faces of the TFT substrate 200a and the counter substrate 200b facing the liquid crystal layer 30, the liquid crystal molecules 30a are oriented vertically to the surface of the vertical alignment layers as shown in FIG. 4B when no voltage is applied through the liquid crystal layer 30. Such a state of the liquid crystal layer 30 is designated as a vertical orientation state. However, depending upon the kinds of the vertical alignment layer and the liquid crystal material, the liquid crystal molecules 30a of the liquid crystal layer 30 in the vertical orientation state may be slightly inclined against the normal line of the surface of the vertical alignment layer (substrate surface). In general, a state where a liquid crystal molecule is oriented with the liquid crystal molecular axis (also designated as the axial direction) inclined at an angle of approximately 85 degrees or more against the surface of a vertical alignment layer is designated as the vertical orientation state.

The TFT substrate 200a of the liquid crystal display device 200 includes a transparent substrate (such as a glass substrate) 11 and a picture element electrode 14 formed thereon. The counter substrate 200b includes a transparent substrate (such as a glass substrate) 21 and a counter electrode 22 formed thereon. In accordance with a voltage applied between each picture element electrode 14 and the counter electrode 22 opposing each other with the liquid crystal layer 30 sandwiched therebetween, the orientation state of the liquid crystal layer 30 in each picture element region is changed. A display is produced by utilizing a phenomenon that the polarizing state and the quantity of light transmitting the liquid crystal layer 30 are changed in accordance with the change of the orientation state of the liquid crystal layer 30.

The picture element electrode 14 of the liquid crystal display device 200 is composed of a solid portion 14b including a plurality of sub-picture element electrodes 55 and a plurality of contact portions 56, and a plurality of openings 14a. The opening 14a corresponds to, in the picture element electrode 14 formed from a conducting film (such as an ITO film), a region where the conducting film is removed, and the solid portion 14b corresponds to a region where the conducting film remains (a region other than the openings 14a). A plurality of openings 14a are formed in each picture element electrode, and the solid portion 14b is basically formed from a single continuous conducting film.

The plural openings 14a are arranged so that their centers form a square lattice, and a region of the solid portion (hereinafter referred to as the unit solid portion 14b') substantially surrounded with four openings 14a whose centers are positioned on four lattice points forming one unit lattice is in a substantially circular shape. Each opening 14a is in a substantially star-shape with four quarter arc-shaped edges having a four-fold rotation axis at its center. The unit lattices are preferably formed up to the edges of the picture element electrode 14 in order to stabilize the orientation over the entire picture element region. Accordingly, as shown in the drawing, the edge of the picture element electrode is preferably patterned into a shape corresponding to approximately a half of the opening 14a (at the side edge of the picture element electrode) or approximately a quarter of the opening 14a (at the corner edge of the picture element electrode).

The openings 14a positioned in the center part of the picture element region have substantially the same shape and the same size. The unit solid portions 14b' respectively positioned in the unit lattices formed by the openings 14a are in a substantially circular shape and have substantially the same shape and the same size. The unit solid portions 14b, adjacent to each other are connected to each other, so as to form the solid portion 14b functioning as a substantially single conducting film.

When a voltage is applied between the picture element electrode 14 having the aforementioned structure and the counter electrode 22, a plurality of liquid crystal domains each having radially-inclined orientation are formed due to inclined electric fields generated at the edge portions of the openings 14a. The liquid crystal domain is formed in each region corresponding to the opening 14a and each region corresponding to the unit solid portion 14b' within the unit lattice.

In this embodiment, the picture element electrode 14 in a square shape is exemplified, but the shape of the picture element electrode 14 is not limited to the square. The general shape of the picture element electrode 14 is approximate to a rectangle (including a square), and hence, the openings 14a can be regularly disposed in the square lattice arrangement. The effect of the invention can be attained even when the picture element electrode 14 is in a shape other than the rectangular shape as far as the openings 14a are arranged regularly (for example, in the square lattice arrangement as described above) so as to form the liquid crystal domains over the entire picture element region.

Figure 5A:
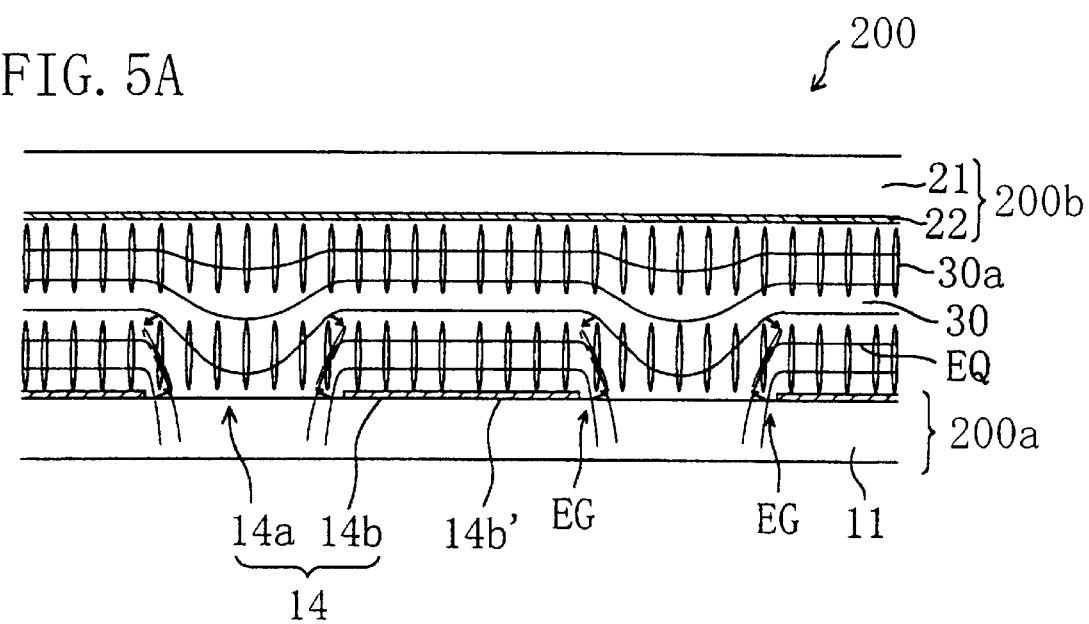
FIGS. 5A and 5B are diagrams for showing states where a voltage is applied through a liquid crystal layer 30 of the liquid crystal display device 200, and specifically FIG. 5A schematically shows a state where orientation starts to change (ON initial state) and FIG. 5B schematically shows the stationary state.
Figure 5B:
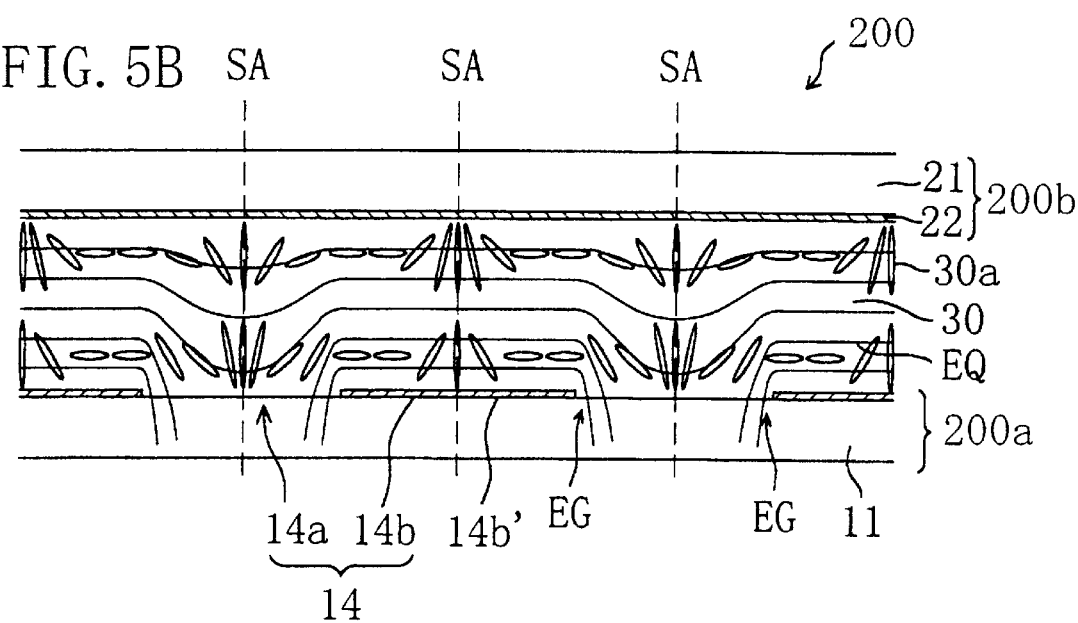

The mechanism of formation of the liquid crystal domains by the inclined electric fields will now be described with reference to FIGS. 5A and 5B. FIGS. 5A and 5B show the states attained by applying a voltage through the liquid crystal layer 30 of FIG. 4B, and specifically, FIG. 5A schematically shows the state where the orientation of the liquid crystal molecules 30a starts to change in accordance with the voltage applied through the liquid crystal layer 30 (ON initial state) and FIG. 5B schematically shows the state where the orientation of the liquid crystal molecules 30a changed in accordance with the applied voltage attains the stationary state. In FIGS. 5A and 5B, a line EQ denotes an equipotential line.

When the picture element electrode 14 and the counter electrode 22 have the same potential (which corresponds to the state where no voltage is applied through the liquid crystal layer 30), the liquid crystal molecules 30a within the picture element region are oriented vertically to the faces of the substrates 11 and 21 as shown in FIG. 4B.

When a voltage is applied through the liquid crystal layer 30, potential gradient expressed by the equipotential line EQ (perpendicularly crossing a line of electric force) of FIG. 5A is formed. The equipotential line EQ is parallel to the surfaces of the solid portion 14b and the counter electrode 22 within a region of the liquid crystal layer 30 positioned between the solid portion 14b of the picture element electrode 14 and the counter electrode 22, and drops in a region corresponding to the opening 14a of the picture element electrode 14. Therefore, the inclined electric field expressed by an oblique portion of the equipotential line EQ is formed in a region of the liquid crystal layer 30 at the edge portion EG of the opening 14a (that is, the inside periphery of the opening 14a including the boundary thereof).

To the liquid crystal molecules 30a having the negative dielectric anisotropy, torque for orienting the axial directions of the liquid crystal molecules 30a parallel to the equipotential line EQ (vertical to the line of electric force) is applied. Accordingly, the liquid crystal molecules 30a disposed above the edge portions EG are inclined (rotated) in the clockwise direction at the edge portion EG on the right hand side in the drawing and in the counterclockwise direction at the edge portion EG on the left hand side in the drawing as shown with arrows in FIG. 5A, so as to orient parallel to the equipotential line EQ.

Now, the change of the orientation of the liquid crystal molecules 30a will be described in detail with reference to FIGS. 6A, 6B, 6C and 6D.

Figure 6A:
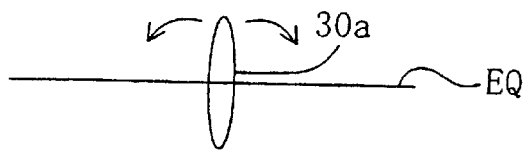
FIGS. 6A, 6B, 6C and 6D are diagrams for schematically showing the relationship between a line of electric force and orientation of liquid crystal molecules.

When the electric field is generated in the liquid crystal layer 30, the torque for orienting the axial direction parallel to the equipotential line EQ is applied to a liquid crystal molecule 30a having the negative dielectric anisotropy. As shown in FIG. 6A, when an electric field expressed by an equipotential line EQ vertical to the axial direction of a liquid crystal molecule 30a is generated, torque is applied to the liquid crystal molecule 30a for inclining it in the clockwise direction or in the counterclockwise direction in equivalent probabilities. Accordingly, in the liquid crystal layer 30 disposed between the parallel plate type electrodes opposing each other, the torque is applied in the clockwise direction to some liquid crystal molecules 30a and in the counterclockwise direction to other liquid crystal molecules 30a. As a result, the orientation state sometimes may not be smoothly changed in accordance with a voltage applied through the liquid crystal layer 30.

Figure 6B:
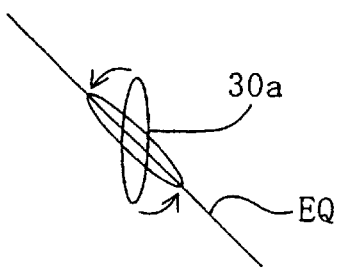
Figure 6C:
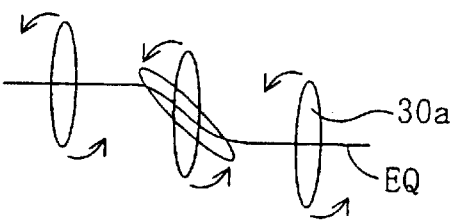
Figure 6D:
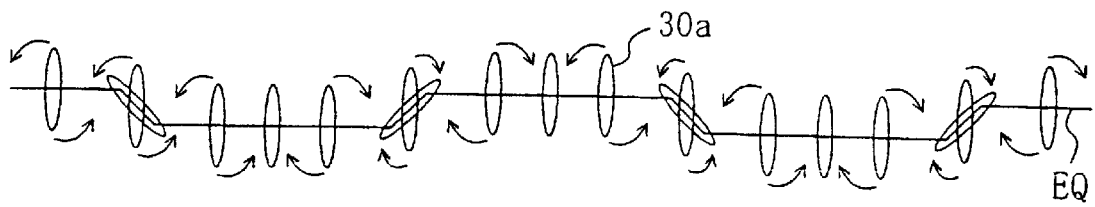

When the electric field oblique against the axial directions of the liquid crystal molecules 30a as expressed by the equipotential line EQ (inclined electric field) is generated at the edge portions EG of the opening 14a of the present liquid crystal display device 200 as shown in FIG. 5A, a liquid crystal molecule 30a is inclined, as shown in FIG. 6B, in a direction for orienting parallel to the equipotential line EQ with smaller inclination (in the counterclockwise direction in the drawing). Furthermore, a liquid crystal molecule 30a positioned in a region where an electric field expressed by an equipotential line EQ vertical to the axial direction is generated is inclined, as shown in FIG. 6C, in the same direction as another liquid crystal molecule 30a positioned on the oblique portion of the equipotential line EQ so as to make continuous (match) their orientations. When an electric field expressed by an equipotential line EQ with continuous irregularities as shown in FIG. 6D is applied, liquid crystal molecules 30a positioned on a flat portion of the equipotential line EQ are oriented in a direction matching with the orientation direction of other liquid crystal molecules 30a positioned on oblique portions of the equipotential line EQ. Herein, "to be positioned on an equipotential line EQ" means "to be positioned within an electric field expressed by an equipotential line EQ".

When the change of the orientation starting from the liquid crystal molecules 30a positioned on the oblique portion of the equipotential line EQ is proceeded as described above and the stationary state is attained, the orientation state as schematically shown in FIG. 5B is obtained. The liquid crystal molecules 30a positioned in the vicinity of the center of the opening 14a are substantially equally affected by the orientations of the liquid crystal molecules 30a positioned at the opposing edge portions EG of the opening 14a, and hence, they keep the orientation state vertical to the equipotential line EQ. The liquid crystal molecules 30a positioned in a region away from the center of the opening 14a are inclined owing to the influence of the orientation of the liquid crystal molecules 30a positioned at the closer edge portion EG, so as to form radially-inclined orientation symmetrically about the center SA of the opening 14a. When this orientation state is seen from the vertical direction to the display surface of the liquid crystal display device 200 (in the vertical direction to the faces of the substrates 11 and 21), the axial directions of the liquid crystal molecules 30a are oriented radially about the center of the opening 14a (not shown). This orientation state is herein designated as "radially-inclined orientation". Also, a region of the liquid crystal layer in which the radially-inclined orientation is obtained about one center is herein designated as a liquid crystal domain.

Also in a region corresponding to the unit solid portion 14b' substantially surrounded with the openings 14a, a liquid crystal domain where the liquid crystal molecules 30a are in the radially-inclined orientation state is formed. The liquid crystal molecules 30a positioned in the region corresponding to the unit solid portion 14b' are affected by the orientations of the liquid crystal molecules 30a positioned at the edge portions EG of the openings 14a, so as to form the radially-inclined orientation symmetrical about the center SA of the unit solid portion 14b' (corresponding to the center of the unit lattice formed by the openings 14a).

The radially-inclined orientation obtained in a liquid crystal domain formed in the unit solid portion 14b' and the radially-inclined orientation obtained in the opening 14a are continuous, and the liquid crystal molecules 30a positioned in these regions are oriented so as to match with the orientation of the liquid crystal molecules 30a positioned at the edge portions EG of the opening 14a. The liquid crystal molecules 30a in the liquid crystal domain formed in the opening 14a are oriented in the shape of a cone opening upward (toward the substrate 200b), and the liquid crystal molecules 30a in the liquid crystal domain formed in the unit solid portion 14b' are oriented in the shape of a cone opening downward (toward the substrate 200a). In this manner, the radially-inclined orientation obtained in the liquid crystal domain formed in the opening 14a and the radially-inclined orientation obtained in the liquid crystal domain formed in the unit solid portion 14b' are mutually continuous. Therefore, a disclination line (orientation defect) is never formed therebetween, resulting in preventing the display quality from lowering due to the occurrence of a disclination line.

In order to improve the viewing angle dependency of the display quality of a liquid crystal display device in all the azimuths, the existing probabilities of liquid crystal molecules oriented in the respective azimuth directions in each picture element region are preferably rotationally symmetrical and are more preferably axially symmetrical. In other words, all the liquid crystal domains formed in the entire picture element region are preferably rotationally symmetrically arranged and more preferably axially symmetrically arranged. However, it is not necessary to attain the rotation symmetry in the entire picture element region but the liquid crystal layer in the picture element region is formed as a collection of liquid crystal domains rotationally symmetrically (or axially symmetrically) arranged (for example, a plurality of liquid crystal domains disposed in the square lattice arrangement). Accordingly, all the plurality of openings 14a formed in the picture element region should not be necessarily rotationally symmetrically arranged in the entire picture element region as far as they are expressed as a collection of openings rotationally symmetrically (or axially symmetrically) arranged (for example, a plurality of openings disposed in the square lattice arrangement). Needless to say, the unit solid portions 14b' each surrounded with the plural openings 14a are similarly arranged. Furthermore, since the shape of each liquid crystal domain is also preferably rotationally symmetrical and more preferably axially symmetrical, the shape of each of the openings 14a and the unit solid portions 14b' is preferably rotationally symmetrical and more preferably axially symmetrical.

In some cases, a sufficient voltage cannot be applied through a portion of the liquid crystal layer 30 in the vicinity of the center of the opening 14a, so that the portion of the liquid crystal layer 30 in the vicinity of the center of the opening 14a cannot make contribution to display. In other words, even when the radially-inclined orientation in the portion of the liquid crystal layer 30 in the vicinity of the opening 14a is slightly disturbed (for example, when the center axis is slightly shifted from the center of the opening 14a), the display quality may not be lowered. Accordingly, at least the liquid crystal domains formed correspondingly to the unit solid portions 14b' should be rotationally symmetrically or axially symmetrically arranged.

As described with reference to FIGS. 5A and 5B, the picture element electrode 14 of the liquid crystal display device 200 of this invention has a plurality of openings 14a, and the electric field expressed by the equipotential line EQ having the oblique portions is formed in the liquid crystal layer 30 within the picture element region. The liquid crystal molecules 30a disposed in the liquid crystal layer 30 and having the negative dielectric anisotropy, which are in the vertical orientation state when no voltage is applied, are changed in their orientation directions by being triggered by the orientation change of the liquid crystal molecules 30a positioned on the oblique portions of the equipotential line EQ, so as to form the liquid crystal domains having the stable radially-inclined orientation in the openings 14a and the solid portion 14b. A display is produced by changing the orientation of the liquid crystal molecules within the liquid crystal domains in accordance with the voltage applied through the liquid crystal layer.

The shape (seen from the substrate normal direction) and the arrangement of the openings 14a of the picture element electrode 14 of the liquid crystal display device 200 of this embodiment will now be described.

The display characteristic of a liquid crystal display device exhibits azimuth angle dependency derived from the orientation state (optical anisotropy) of liquid crystal molecules. In order to reduce the azimuth angle dependency of the display characteristic, the liquid crystal molecules are preferably oriented in the respective azimuth angles in equivalent probabilities. Furthermore, the liquid crystal molecules within each picture element region are preferably oriented in the respective azimuth angles in equivalent probabilities. Accordingly, the opening 14a preferably has such a shape that the liquid crystal domains can be formed so as to align the liquid crystal molecules 30a in each picture element region in the respective azimuth angles in equivalent probabilities. Specifically, the shape of the opening 14a is preferably rotationally symmetrical (preferably with a rotation axis of two or more folds) having its center (along the normal line) as a symmetry axis, and the plurality of openings 14a are preferably arranged so as to have rotational symmetry. Also, the shape of the unit solid portion 14b' substantially surrounded with the openings is preferably rotationally symmetrical, and the unit solid portions 14b' are preferably arranged so as to have rotational symmetry.

However, it is not necessary to arrange the openings 14a and the unit solid portions 14b' so as to have rotational symmetry all over the picture element region, but when, for example, a square lattice (symmetrical with a four-fold rotation axis) is used as a minimum unit so as to form a picture element region from the combination of the square lattices as is shown in FIG. 4A, the liquid crystal molecules can be oriented in all the azimuth angles in substantially equivalent probabilities in the entire picture element region.

The orientation state of the liquid crystal molecules 30a obtained when the rotationally symmetrical star-shaped openings 14a and the substantially circular unit solid portions 14b' are disposed in the square lattice arrangement as shown in FIG. 4A will now be described with reference to FIGS. 7A, 7B and 7C.

Figure 7A:
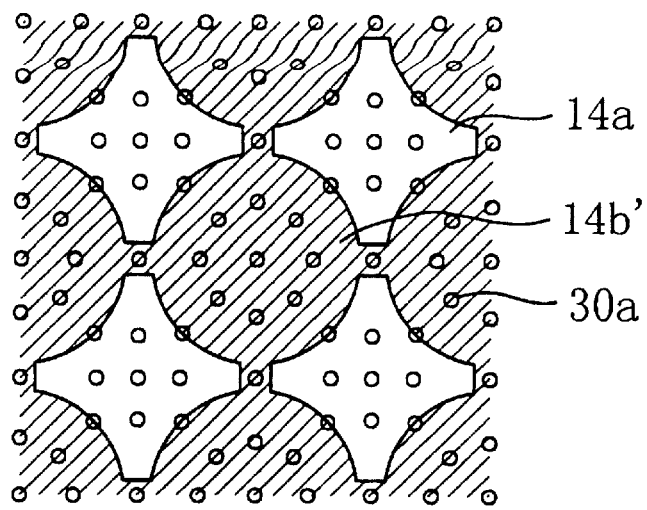
FIGS. 7A, 7B and 7C are diagrams for schematically showing orientation states of liquid crystal molecules seen from the substrate normal direction in the liquid crystal display device 200 of Embodiment 2.
Figure 7B:
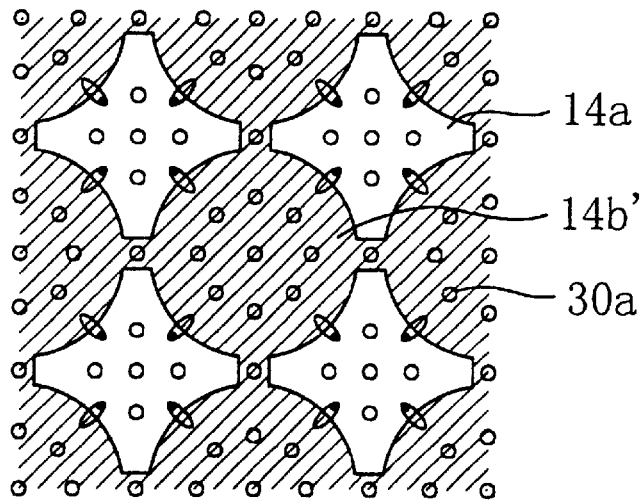
Figure 7C:
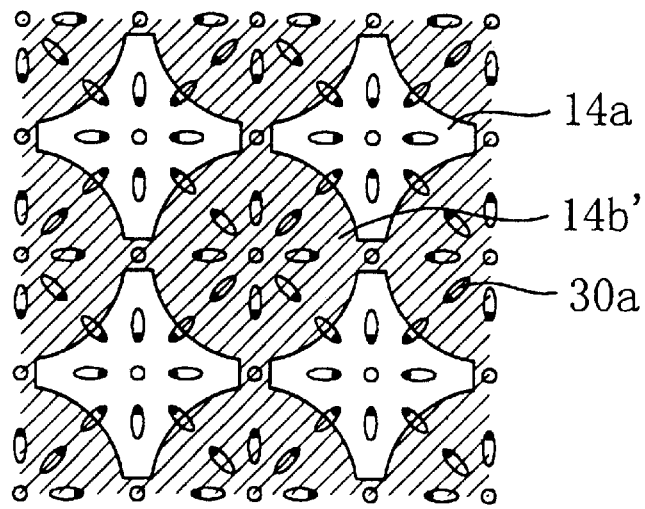

FIGS. 7A, 7B and 7C schematically show the orientation states of the liquid crystal molecules 30a seen from the substrate normal direction. In a drawing for showing the orientation state of the liquid crystal molecules 30a seen from the substrate normal direction like FIGS. 7B and 7C, a black end of each liquid crystal molecule 30a drawn in the shape of an ellipse means that the liquid crystal molecule 30a is inclined so that the black end be closer to the substrate where the picture element electrode 14 having the openings 14a is formed than the other end. This also applies to other drawings mentioned below. Herein, one unit lattice (formed by the four openings 14a) within the picture element region shown in FIG. 4A will be described. The cross-sectional views of FIGS. 7A, 7B and 7C taken along their diagonals respectively correspond to FIGS. 4B, 5A and 5B, which are also referred to in the following description.

When the picture element electrode 14 and the counter electrode 22 have the same potential, namely, when no voltage is applied through the liquid crystal layer 30, the liquid crystal molecules 30a controlled in their orientation directions by the vertical alignment layers (not shown) provided on the faces of the TFT substrate 200a and the counter substrate 200b facing the liquid crystal layer 30 are in the vertical orientation state as shown in FIG. 7A.

When the electric field expressed by the equipotential line EQ of FIG. 5A is generated by applying a voltage through the liquid crystal layer 30, the torque is applied to the liquid crystal molecules 30a having the negative dielectric anisotropy so that their axial directions can be parallel to the equipotential line EQ. As described with reference to FIGS. 6A and 6B, with respect to a liquid crystal molecule 30a positioned in the electric field expressed by a portion of the equipotential line EQ vertical to the molecular axis of the liquid crystal molecule 30a, the inclination (rotation) direction is not uniquely determined (as shown in FIG. 6A), and hence, the orientation change (inclination or rotation) cannot be easily caused. In contrast, with respect to a liquid crystal molecule 30a positioned on a portion of the equipotential line EQ oblique against the molecular axis of the liquid crystal molecule 30a, the inclination (rotation) direction is uniquely determined, and hence, the orientation change is easily caused. Accordingly, as shown in FIG. 7B, the liquid crystal molecules 30a start to incline from the edge portions of the openings 14a where the molecular axes of the liquid crystal molecules 30a are oblique against the equipotential line EQ. Then, as described with reference to FIG. 6C, the liquid crystal molecules 30a positioned around the inclined liquid crystal molecules 30a at the edge portions of the openings 14a are also inclined so as to match their orientations. As a result, the axial directions of the liquid crystal molecules 30a become stable in a state shown in FIG. 7C (in the radially-inclined orientation state.).

In this manner, when the opening 14a has the rotationally symmetrical shape, the liquid crystal molecules 30a within the picture element region are inclined from the edge portions of the opening 14a toward the center of the opening 14a by applying a voltage. Therefore, the liquid crystal molecules 30a positioned in the vicinity of the center of the opening 14a, where the forces for controlling the orientation of the liquid crystal molecules 30a working from the respective edge portions are balanced, are kept to be vertically oriented, with the liquid crystal molecules 30a positioned around continuously inclined radially around the liquid crystal molecules 30a positioned in the vicinity of the center of the opening 14a.

Also, the liquid crystal molecules 30a positioned in the region corresponding to the substantially circular unit solid portion 14b' surrounded with the substantially star-shaped four openings 14a disposed in the square lattice arrangement are inclined so as to match their orientations with the orientation of the liquid crystal molecules 30a inclined owing to the inclined electric fields generated at the edge portions of the opening 14a. The liquid crystal molecules 30a positioned in the vicinity of the center of the unit solid portion 14b', where the forces for controlling the orientation of the liquid crystal molecules 30a working from the edge portions are balanced, keep their vertical orientation to the substrate surface, with the liquid crystal molecules 30a positioned around continuously inclined radially around the liquid crystal molecules 30a positioned in the vicinity of the center of the unit solid portion 14b'.

When the liquid crystal domains in which the liquid crystal molecules 30a are in the radially-inclined orientation state are disposed in the square lattice arrangement in the entire picture element region in this manner, the existing probability of the axial directions of the liquid crystal molecules 30a is rotationally symmetrical, and hence, high quality display free from unevenness can be realized in all the viewing directions. In order to reduce the viewing angle dependency of the liquid crystal domain with the radially-inclined orientation, the liquid crystal domain is preferably highly rotationally symmetrical (with a rotation axis preferably of two or more folds and more preferably of four or more folds). Furthermore, in order to reduce the viewing angle dependency of the entire picture element region, the plural liquid crystal domains formed in the picture element region are preferably disposed in arrangement (of, for example, a square lattice) expressed by a combination of a unit (of, for example, a unit lattice) that is highly rotationally symmetrical (with a rotation axis preferably of two or more folds and more preferably of four or more folds).

Figure 8A:
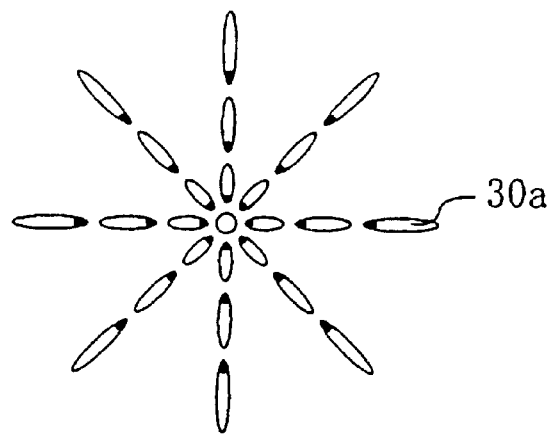
FIGS. 8A, 8B and 8C are diagrams for schematically showing examples of radially-inclined orientation of liquid crystal molecules.
Figure 8B:
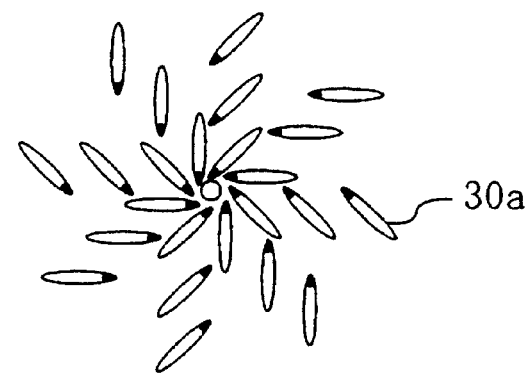
Figure 8C:
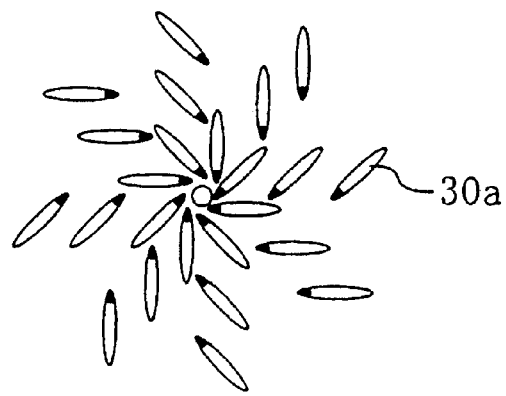

The radially-inclined orientation of the liquid crystal molecules 30a is more stable when it is clockwise or counterclockwise spiral radially-inclined orientation as shown in FIGS. 8B and 8C than when it is simple radially-inclined orientation as shown in FIG. 8A. In such spiral orientation, the orientation directions of the liquid crystal molecules 30a are not spirally changed along the thickness direction of the liquid crystal layer 30 as in the general twist orientation but the orientation directions of the liquid crystal molecules 30a are minimally changed along the thickness direction of the liquid crystal layer 30 when seen in a small region. Specifically, in a cross-section taken in any position along the thickness direction of the liquid crystal layer 30 (in any cross-section on a plane parallel to the layer surface), the orientation state is the same as that of FIG. 8B or 8C and twist change along the thickness direction of the liquid crystal layer 30 is minimally caused. However, in the entire liquid crystal domain, the twist change is caused to some extent.

When a chiral agent is added to the nematic liquid crystal material having the negative dielectric anisotropy, the liquid crystal molecules 30a attain the counterclockwise or clockwise spiral radially-inclined orientation as shown in FIG. 8B or 8C around the center of the opening 14a or the unit solid portion 14b' under voltage application. The spiral direction depends upon the kind of chiral agent to be used. Accordingly, by placing the liquid crystal layer 30 in the opening 14 in the spiral radially-inclined orientation state under voltage application, the radially inclined liquid crystal molecules 30a around the liquid crystal molecules 30a oriented vertically to the substrate face can be made to incline in the same spiral direction in all the liquid crystal domains, resulting in realizing even display free from unevenness. Furthermore, since the spiral direction around the liquid crystal molecules 30a oriented vertically to the substrate face is thus determined, the response speed in applying a voltage through the liquid crystal layer 30 can be improved.

When a chiral agent is added, the orientation of the liquid crystal molecules 30a can be spirally changed along the thickness direction of the liquid crystal layer 30 as in the general twist orientation. In an orientation state where the orientation of the liquid crystal molecules 30a is not spirally changed along the thickness direction of the liquid crystal layer 30, liquid crystal molecules 30a oriented vertically or parallel to the polarization axis of a polarizing plate do not cause a phase difference in incident light, and hence, incident light passing through a region in such an orientation state makes no contribution to the transmittance. In contrast, in the orientation state where the orientation of the liquid crystal molecules 30a is spirally changed along the thickness direction of the liquid crystal layer 30, also liquid crystal molecules 30a oriented vertically or parallel to the polarization axis of the polarizing plate cause a phase difference in incident light, and the optical activity of the light can be utilized. Accordingly, the incident light passing through a region in such an orientation state can make contribution to the transmittance, resulting in realizing a liquid crystal display device capable of bright display.

Although the opening 14a is in the substantially star-shape and the unit solid portion 14b' is in the substantially circular shape and they are disposed in the square lattice arrangement in FIG. 4A, the shapes and the arrangement of the opening 14a and the unit solid portion 14b' are not limited to those shown in FIG. 4A.

Figure 9A:
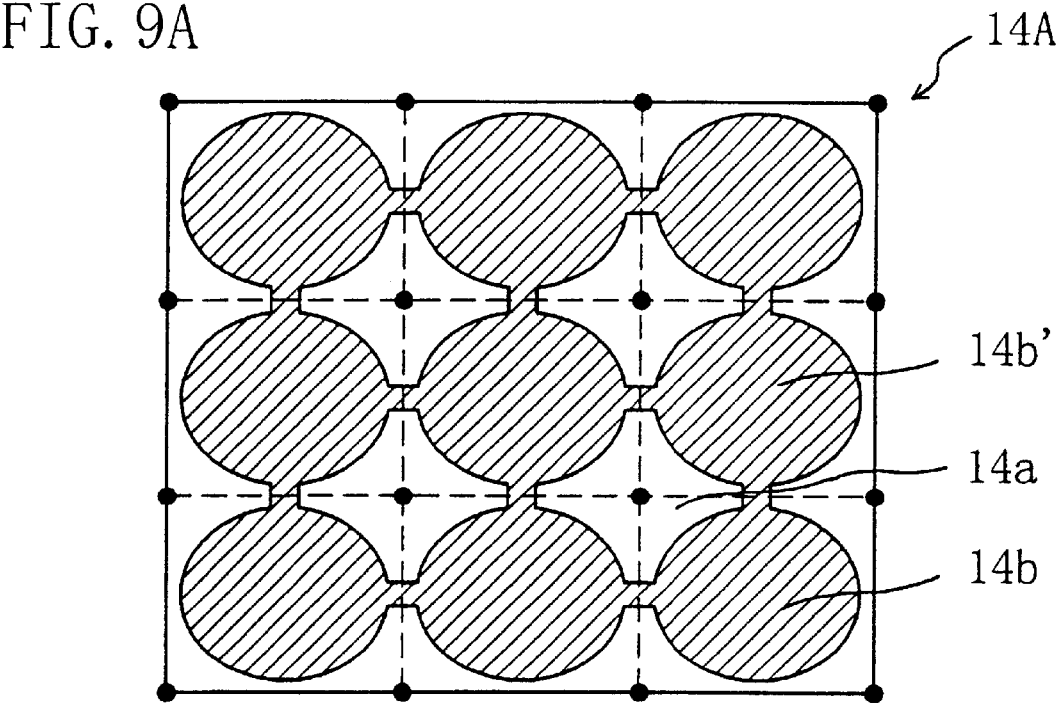
FIGS. 9A and 9B are top views for schematically showing other picture element electrodes usable in the liquid crystal display device of Embodiment 2.
Figure 9B:
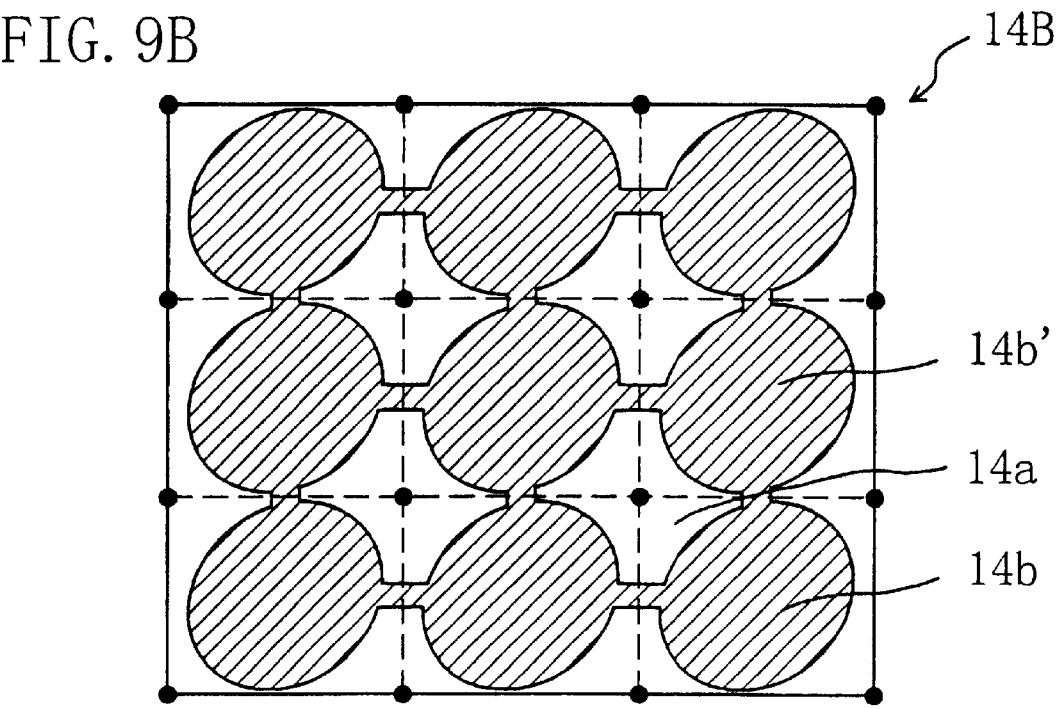

FIGS. 9A and 9B are top views of picture element electrodes 14A and 14B having openings 14a and unit solid portions 14b' in different shapes.

The openings 14a and the unit solid portions 14b' of the picture element electrodes 14A and 14B shown in FIGS. 9A and 9B are in the shapes slightly strained as compared with the opening 14a and the unit solid portion 14b' shown in FIG. 4A. The openings 14a and the unit solid portions 14b' of the picture element electrodes 14A and 14B have a two-fold rotation axis (not a four-fold rotation axis) and are regularly arranged so as to form a rectangular unit lattice. Each opening 14a is in a strained star-shape, and each unit solid portion 14b' is in an elliptical shape (strained circular shape). Also when any of the picture element electrodes 14A and 14B is used, a liquid crystal display device with high display quality and a good viewing angle characteristic can be obtained.

Figure 10A:
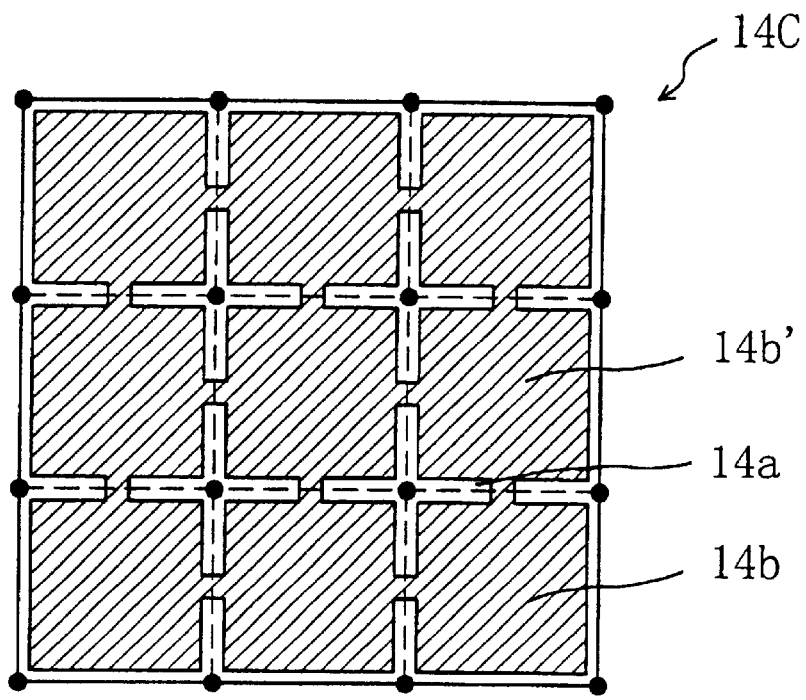
FIGS. 10A and 10B are top views for schematically showing still other picture element electrodes usable in the liquid crystal display device of Embodiment 2.
Figure 10B:
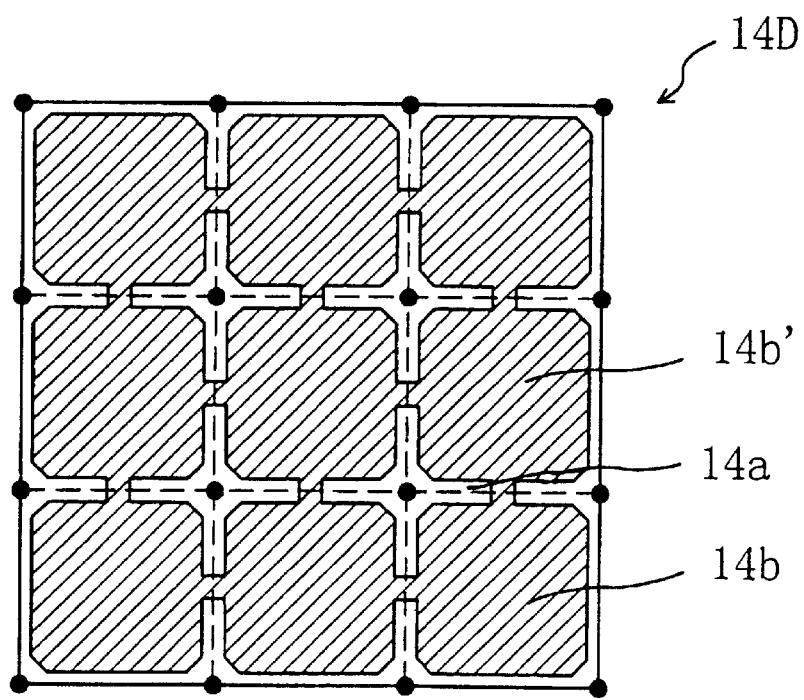

Furthermore, any of picture element electrodes 14C and 14D respectively shown in FIGS. 10A and 10B may be used.

In each of the picture element electrodes 14C and 14D, openings 14a each in substantially a cross-shape are disposed in a square lattice arrangement so as to form a unit solid portion 14b' in substantially a square shape. Needless to say, they may be strained and arranged to form a rectangular unit lattice. Also when such unit solid portions 14b' in a substantially rectangular shape (including a square shape) are thus regularly arranged, a liquid crystal display device having high display quality and a good viewing angle characteristic can be obtained.

However, the opening 14a and/or the unit solid portion 14b' are preferably in a circular or elliptical shape as compared with a rectangular shape because the radially-inclined orientation can be stabilized when they are circular or elliptical. This is probably because the edge portions of the openings 14a are continuously (smoothly) changed when they are circular or elliptical so that the orientation directions of the liquid crystal molecules 30a can be continuously (smoothly) changed.

Figure 11A:
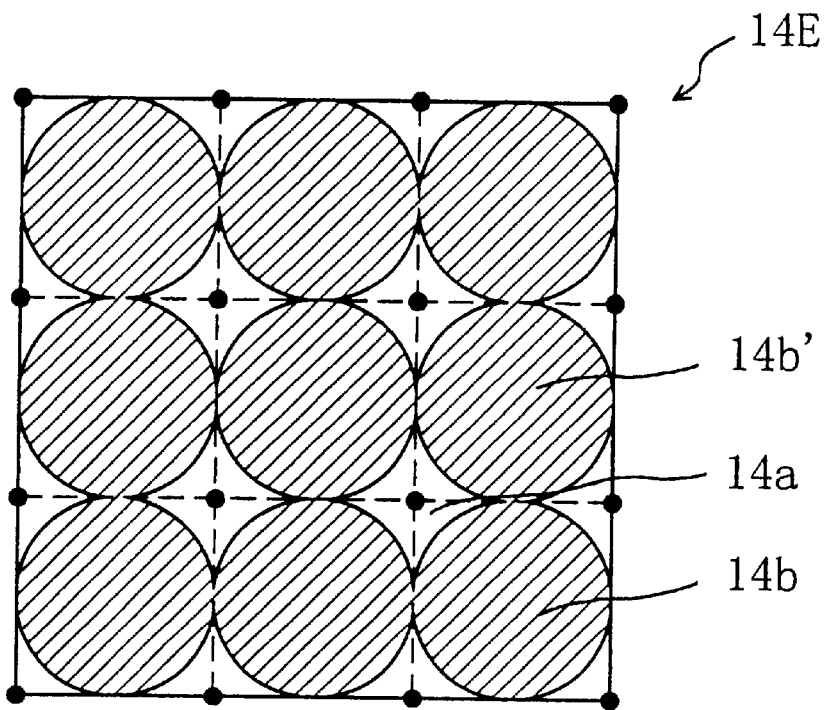
FIGS. 11A and 11B are top views for schematically showing still other picture element electrodes usable in the liquid crystal display device of Embodiment 2.
Figure 11B:
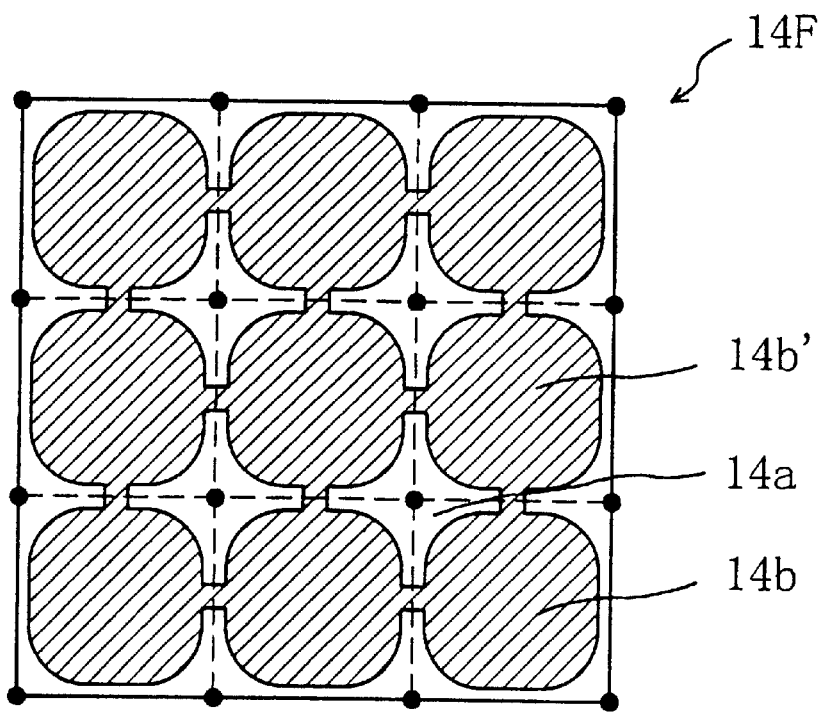

From the viewpoint of the aforementioned continuity in the orientation directions of the liquid crystal molecules 30a, any of picture element electrodes 14E and 14F respectively shown in FIGS. 11A and 11B may be used. The picture element electrode 14E of FIG. 11A is a modification of the picture element electrode 14 of FIG. 4A and has an opening 14a formed from four arcs alone. The picture element electrode 14F of FIG. 11B is a modification of the picture element electrode 14D of FIG. 10B and has an opening 14a having arc-shaped edges adjacent to unit solid portions 14b'. The opening 14a and the unit solid portion 14b' of each of the picture element electrodes 14E and 14F have a four-fold rotation axis and are disposed in a square lattice arrangement (with a four-fold rotation axis). However, the opening 14a and the unit solid portion 14b' may be strained to have a two-fold rotation axis and disposed in a rectangular lattice arrangement (with a two-fold rotation axis) as shown in FIGS. 9A and 9B.

Figure 12:
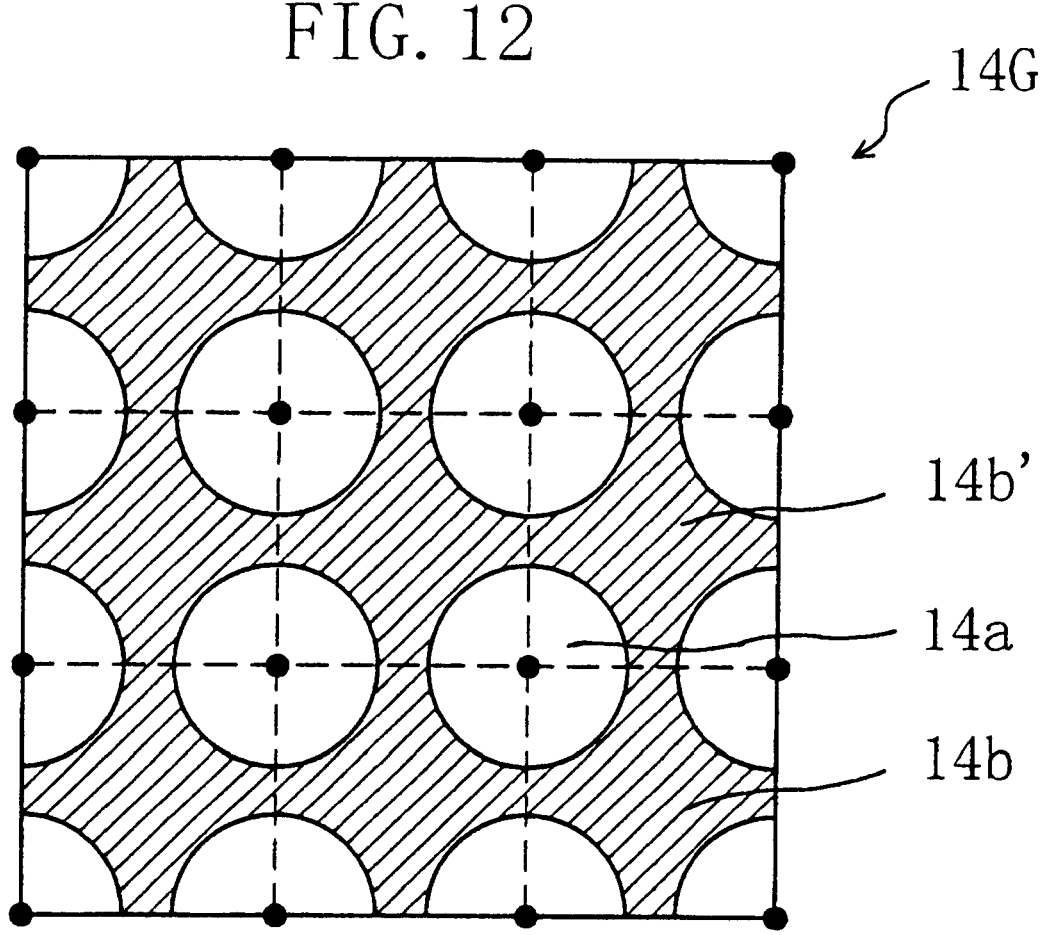
FIG. 12 is a top view for schematically showing still another picture element electrode usable in the liquid crystal display device of Embodiment 2.
Figure 13A:
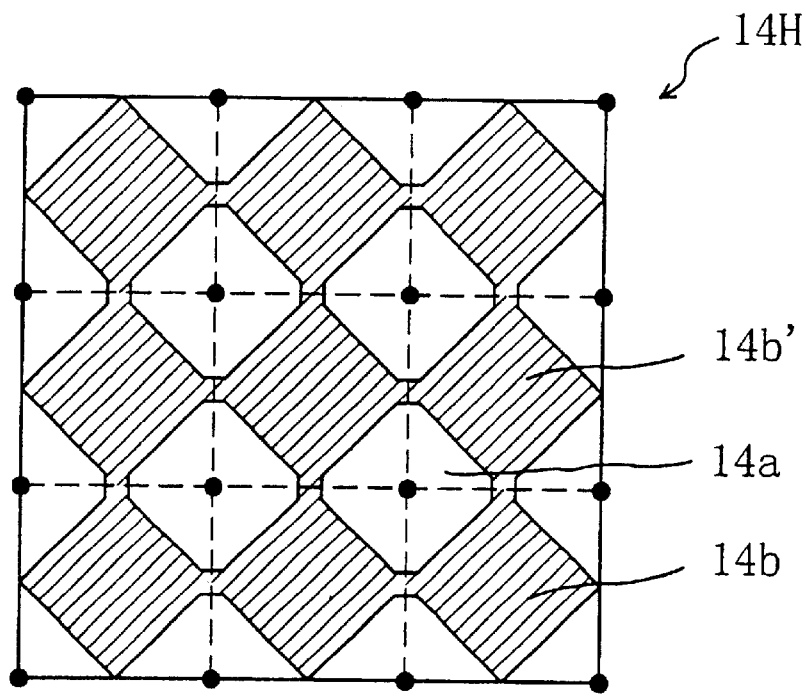
FIGS. 13A and 13B are top views for schematically showing still other picture element electrodes usable in the liquid crystal display device of Embodiment 2.
Figure 13B:
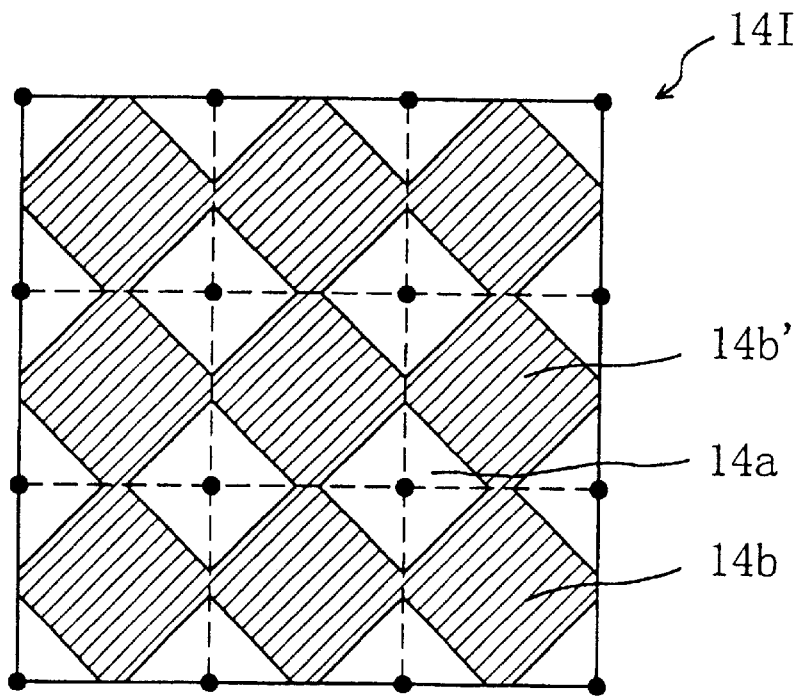

In the aforementioned examples, the opening 14a is formed in the substantially star-shape or the substantially cross-shape, and the unit solid portion 14b' is formed in the substantially circular shape, the substantially elliptical shape, the substantially square (rectangular) shape or the substantially rectangular shape with round corners. In contrast, the relationship between the opening 14a and the unit solid portion 14b' may be negatively/positively reversed. For example, FIG. 12 shows a picture element electrode 14G having a pattern obtained by negatively/positively reversing the pattern of the opening 14a and the unit solid portion 14b of the picture element electrode 14 of FIG. 4A. The picture element electrode 14G having such a negatively/positively reversed pattern can exhibit substantially the same function as the picture element electrode 14 of FIG. 1. In the case where the opening 14a and the unit solid portion 14b' are both in a substantially square shape as in picture element electrodes 14H and 14I respectively shown in FIGS. 13A and 13B, a negatively/positively reversed pattern are the same as the original pattern.

Also in the pattern of FIG. 12 obtained by negatively/positive reversing the pattern of FIG. 4A, a part (approximately a half or a quarter) of the opening 14a is preferably formed at each edge portion of the picture element electrode 14 so as to form a rotationally symmetrical unit solid portion 14b'. Thus, the effect derived from the inclined electric fields can be obtained also at the edges of the picture element region as at the center of the picture element region, so as to realize stable radially-inclined orientation in the entire picture element region.

Now, it will be described whether a negative pattern or a positive pattern should be employed by exemplifying the picture element electrode 14 of FIG. 4A and the picture element electrode 14G of FIG. 12 having the pattern obtained by negatively/positively reversing the pattern of the opening 14a and the unit solid portion 14b' of the picture element electrode 14.

In either of the negative and positive patterns, the length of the edge portions of the opening 14a is the same. Accordingly, there is no difference between these patterns in the function to generate the inclined electric field. However, the area ratio of the unit solid portions 14b' (the ratio to the entire area of the picture element electrode 14) may be different in these patterns. Specifically, the patterns may be different in the area of the solid portion 14b (where the conducting film actually exists) for generating the electric fields applied to the liquid crystal molecules of the liquid crystal layer.

A voltage applied to a liquid crystal domain formed in the opening 14a is lower than a voltage applied to a liquid crystal domain formed in the solid portion 14b. Therefore, for example, in normally black mode display, the liquid crystal domain formed in the opening 14a is darker. In other words, as the area ratio of the opening 14a is higher, the display luminescence tends to be lowered. Accordingly, the area ratio of the solid portion 14b is preferably higher.

It depends upon the pitch (size) of the unit lattice in which of the pattern of FIG. 4A and the pattern of FIG. 12 the area ratio of the solid portion 14b is higher.

Figure 14A:
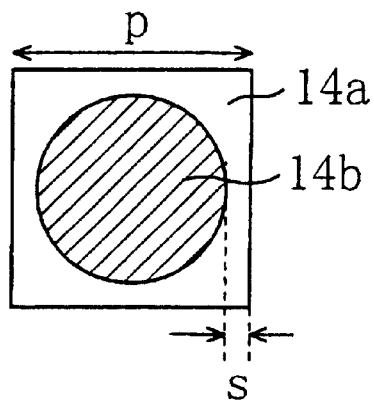
FIG. 14A is a schematic diagram of a unit lattice of a pattern shown in FIG. 4A.
Figure 14B:
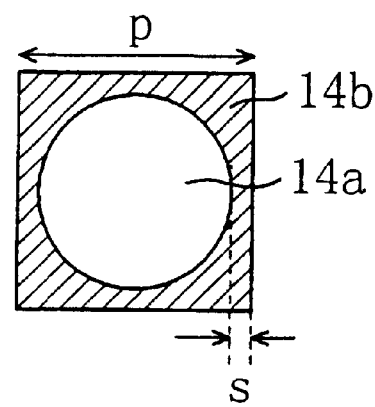
FIG. 14B is a schematic diagram of a unit lattice of a pattern shown in FIG. 12

FIG. 14A shows the unit lattice of the pattern of FIG. 4A, and FIG. 14B shows the unit lattice (whereas having the opening 14a at the center) of the pattern of FIG. 12. In FIG. 14B, portions for mutually connecting the adjacent unit solid portions 14b' (namely, branch portions extending in the four directions from the circular portion) in FIG. 12 are omitted. It is herein assumed that the length (pitch) of one side of the square unit lattice is p and that the length of a space between the opening 14a or the unit solid portion 14b' and the unit lattice (side space) is s.

A variety of picture element electrodes 14 respectively having different pitches p and different side spaces s are fabricated, so as to examine the stability of the radially-inclined orientation and the like. As a result, it is first found that, in order to generate inclined electric fields necessary for attaining the radially-inclined orientation by using a picture element electrode 14 having the pattern of FIG. 14A (hereinafter referred to as the positive pattern), the side space s should be approximately 2.75 μm or more. On the other hand, with respect to a picture element electrode 14 having the pattern of FIG. 14B (hereinafter referred to as the negative pattern), it is found that the side space s should be approximately 2.75 μm or more for generating the inclined electric fields for attaining the radially-inclined orientation. With the side spaces s set to these lower limit values, the area ratios of the solid portion 14b obtained by varying the value of the pitch p are examined. The results are shown in Table 1 and FIG. 14C.

TABLE 1

| Pitch p (μm) | Area ratio of solid portion (%) | |
|---|---|---|
| | Positive pattern | Negative pattern |
| 20 | 41.3 | 52.9 |
| 25 | 47.8 | 47.2 |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

Figure 14C:
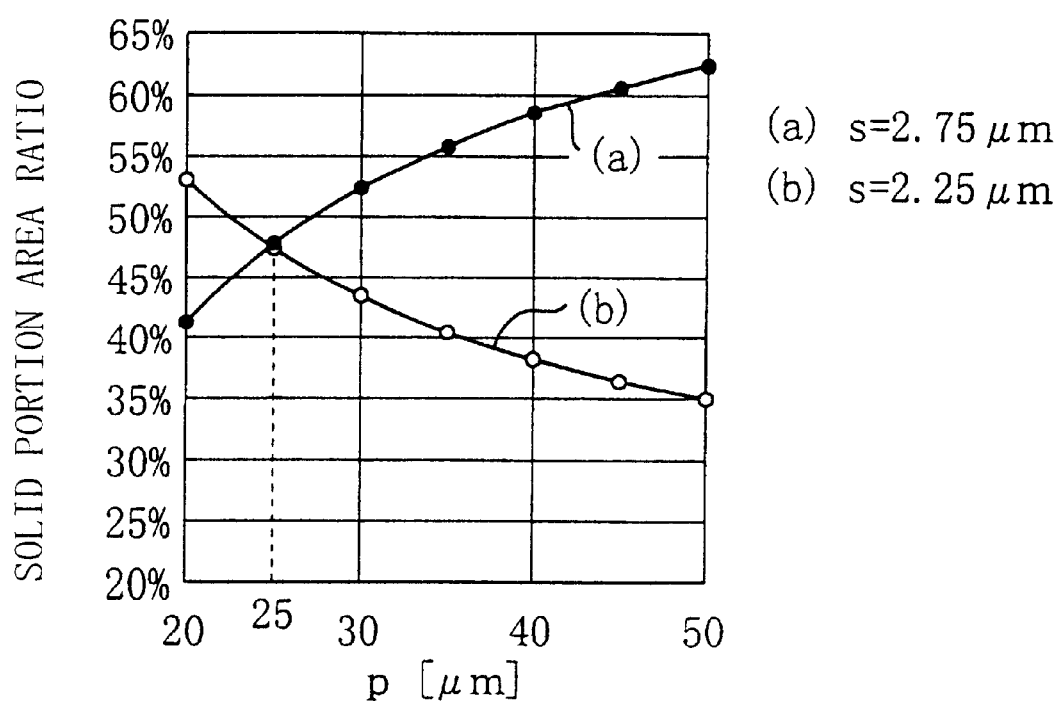
FIG. 14C is a graph for showing the relationship between a pitch p and an area ratio of a solid portion.

As is understood from Table 1 and FIG. 14C, when the pitch p is approximately 25 μm or more, the area ratio of the solid portion 14b is higher in the positive pattern (shown in FIG. 14A), and when the pitch p is smaller than approximately 25 μm, the area ratio of the solid portion 14b is higher in the negative pattern (shown in FIG. 14B). Accordingly, from the viewpoint of the display luminescence and the stability of orientation, the pattern to be employed is changed depending upon whether the pitch p is larger than or smaller than approximately 25 μm. For example, in the case where three or less unit lattices are formed in the lateral direction of a picture element electrode 14 with a width of 75 μm, the positive pattern as shown in FIG. 14A is preferred, and in the case where four or more unit lattices are formed, the negative pattern as shown in FIG. 14B is preferred. In employing any of the patterns other than the exemplified patterns of FIGS. 14A and 14B, a positive pattern or a negative pattern is appropriately selected so as to attain a higher area ratio of the solid portion 14b.

The number of unit lattices is obtained as follows: The size of a unit lattice is calculated so that one, two or a larger integral number of unit lattices can be arranged along the width or length of the picture element electrode 14. The area ratio of a solid portion is calculated with respect to each size of the unit lattice, so as to select the unit lattice size for maximizing the area ratio of the solid portion. However, the orientation-regulating force obtained by the inclined electric fields is degraded and the stable radially-inclined orientation is difficult to attain when the diameter of the unit solid portion 14b' is smaller than 15 μm in employing a positive pattern and when the diameter of the opening 14a is smaller than 15 μm in employing a negative pattern. The lower limit values of these diameters are obtained when the liquid crystal layer 30 has a thickness of approximately 3 μm. In the case where the liquid crystal layer 30 has a smaller thickness, the stable radially-inclined orientation can be attained even when the diameter of the unit solid portion 14b' or the opening 14a is smaller than the lower limit value. In the case where the liquid crystal layer 30 has a larger thickness, the lower limit value of the diameter of the unit solid portion 14b' or the opening 14a required for attaining the stable radially-inclined orientation is larger than the aforementioned lower limit value.

As described in detail below, the stability of the radially-inclined orientation can be improved by forming a protrusion within the opening 14a. The aforementioned conditions are applied when no protrusion is formed.

The structure of the liquid crystal display device of Embodiment 2 is substantially the same as that of a conventional vertical orientation type liquid crystal display device except that the picture element electrode 14 has the openings 14a, and the present liquid crystal display device can be fabricated by any of the known fabrication methods.

In order to vertically align the liquid crystal molecules having the negative dielectric anisotropy, the vertical alignment layers (not shown) are typically formed on the faces of the picture element electrode 14 and the counter electrode 22 facing the liquid crystal layer 30.

As the liquid crystal material, a nematic liquid crystal material having the negative dielectric anisotropy is used. Also, a liquid crystal display device of a guest-host mode may be fabricated by adding a dichroic pigment. A liquid crystal display device of a guest-host mode does not require a polarizing plate.

Next, as a modification of the liquid crystal display device 200 of Embodiment 2, a liquid crystal display device 200' including a protrusion within the opening 14a will be described.

Figure 15A:
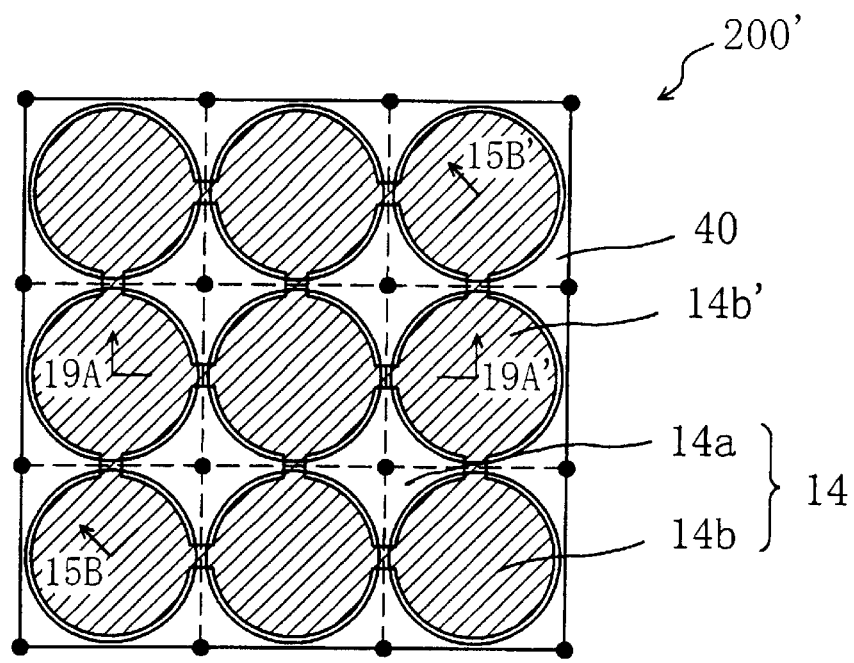
FIG. 15A is a top view for schematically showing the structure of one picture element region of a liquid crystal display device 200' of a modification of Embodiment 2 and FIG. 15B is a cross-sectional view taken along line 15B–15B' of FIG. 15A.
Figure 15B:
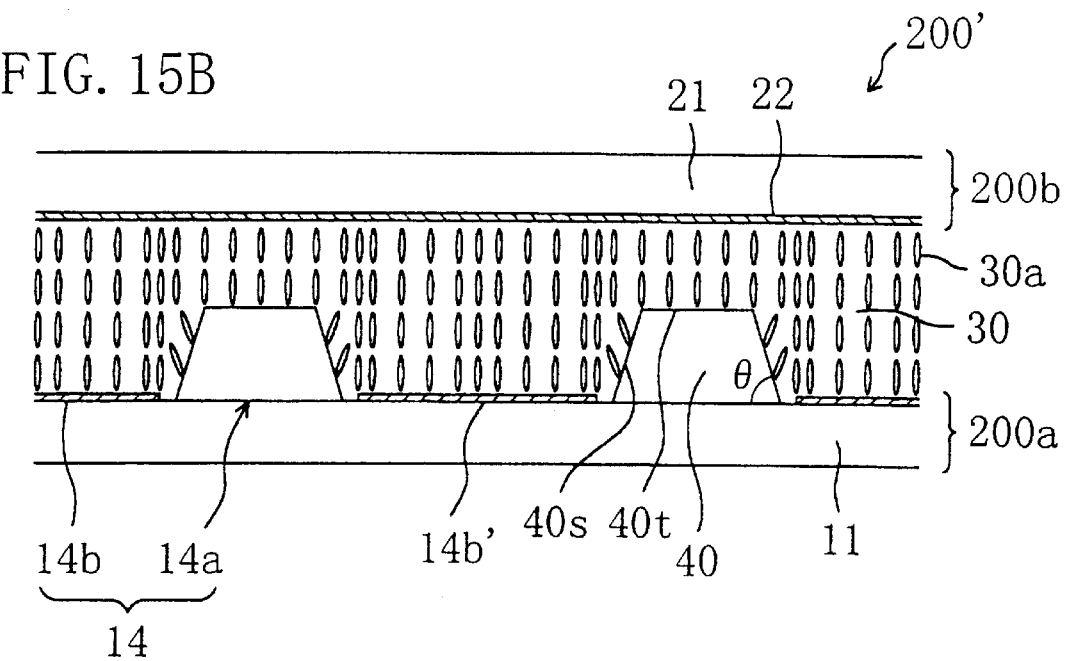

The structure of one picture element region of the liquid crystal display device 200' will now be described with reference to FIGS. 15A and 15B. In drawings referred to below, like reference numerals are used to refer to like elements having substantially the same functions as those of the liquid crystal display device 200, so as to omit the description. FIG. 15A is a top view seen from the substrate normal direction, and FIG. 15B is a cross-sectional view taken along line 15B–15B' of FIG. 15A. FIG. 15B shows a state where no voltage is applied through the liquid crystal layer.

As shown in FIGS. 15A and 15B, the liquid crystal display device 200' is different from the liquid crystal display device 200 of Embodiment 2 shown in FIGS. 4A and 4B in a TFT substrate 200a' including a protrusion 40 within each opening 14a of the picture element electrode 14. On the protrusion 40, a vertical alignment layer (not shown) is provided.

The cross-sectional structure of the protrusion 40 taken along a plane direction of the substrate 11 is the same as the shape of the opening 14a as is shown in FIG. 15A, and is herein a substantially star-shape. The adjacent protrusions 40 are mutually connected, so as to completely surround the unit solid portion 14b' substantially circularly. The cross-sectional structure of the protrusion 40 taken vertically to the plane direction of the substrate 11 is in a trapezoidal shape as shown in FIG. 15B. Specifically, the protrusion has a top face 40t parallel to the substrate face and side faces 40s inclined at a taper angle θ (<90°) against the substrate face. Since the vertical alignment layer (not shown) is formed so as to cover the protrusion 40, the side face 40s of the protrusion 40 has a control force for orienting the liquid crystal molecules 30a of the liquid crystal layer 30 in the same direction as the orientation-regulating direction obtained by the inclined electric fields, so as to stabilize the radially-inclined orientation.

This function of the protrusion 40 will now be described with reference to FIGS. 16A, 16B, 16C, 16D, 17A and 17B.

First, the relationship between the orientation of a liquid crystal molecule 30a and the shape of a face having a vertical alignment property will be described with reference to FIGS. 16A, 16B, 16C and 16D.

Figure 16A:
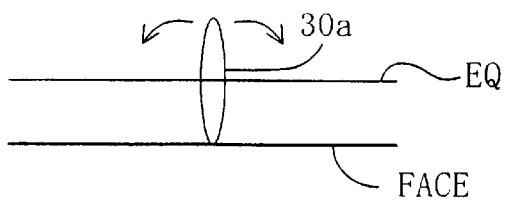
FIGS. 16A, 16B, 16C and 16D are schematic diagrams for explaining the relationship between orientation of liquid crystal molecules 30a and the shape of a face having a vertical alignment property.

As shown in FIG. 16A, a liquid crystal molecule 30a positioned on a horizontal face is oriented vertically to the face by the orientation-regulating force of the face having the vertical alignment property (typically, a surface of a vertical alignment layer). When an electric field expressed by an equipotential line EQ vertical to the axial direction of the liquid crystal molecule 30a is applied to this vertically oriented liquid crystal molecule 30a, torque is applied to the liquid crystal molecule 30a for inclining it in the clockwise direction or in the counterclockwise direction in equivalent probabilities. Accordingly, in the liquid crystal layer 30 disposed between parallel plate type electrodes opposing each other, the torque is applied in the clockwise direction to some liquid crystal molecules 30a and in the counter-clockwise direction to other liquid crystal molecules 30a. As a result, the change to the orientation state in accordance with the voltage applied through the liquid crystal layer 30 sometimes may not be smoothly caused.

Figure 16B:
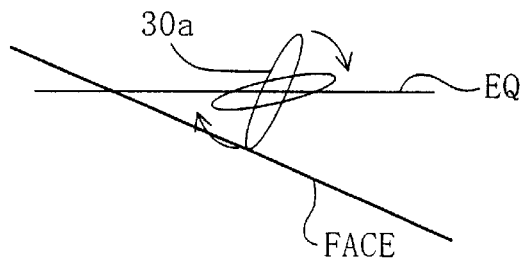
Figure 16C:
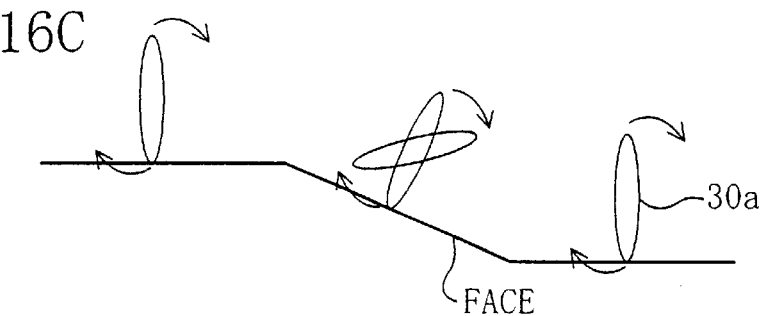

As shown in FIG. 16B, when the electric field expressed by a horizontal equipotential line EQ is applied to a liquid crystal molecules 30a oriented vertically to an inclined face, the liquid crystal molecule 30a is inclined in a direction for orienting parallel to the equipotential line EQ with smaller inclination (in the clockwise direction in the drawing). Furthermore, as shown in FIG. 16C, a liquid crystal molecule 30a oriented vertically to the horizontal face is inclined in the same direction (the clockwise direction) as another liquid crystal molecule 30a positioned on the inclined face so as to make continuous (match) their orientations.

Figure 16D:
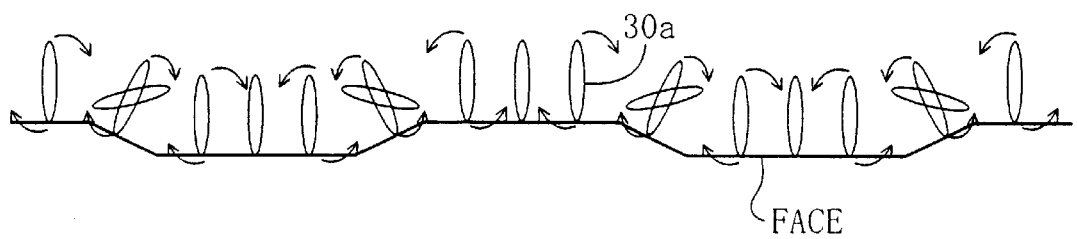

As shown in FIG. 16D, on an irregular face whose cross-section is in a continuous trapezoidal shape, liquid crystal molecules 30a positioned on the top or lower horizontal faces are oriented so as to match with the orientation directions of liquid crystal molecules 30a positioned on the inclined faces.

In the liquid crystal display device 200', the radially-inclined orientation is stabilized by making the direction of the orientation regulation derived from such a face shape (protrusion) accord with the direction of the orientation regulation obtained by the inclined electric fields.

FIGS. 17A and 17B show states obtained by applying a voltage through the liquid crystal layer 30 of FIG. 15B, and specifically, FIG. 17A schematically shows the state where the orientation of the liquid crystal molecules 30a starts to change in accordance with the voltage applied through the liquid crystal layer 30 (the ON initial state) and FIG. 17B schematically shows the state where the orientation of the liquid crystal molecules 30a changed in accordance with the applied voltage attains the stationary state. In FIGS. 17A and 17B, a line EQ denotes an equipotential line.

When the picture element electrode 14 and the counter electrode 22 have the same potential (namely, when no voltage is applied through the liquid crystal layer 30), the liquid crystal molecules 30a within the picture element region are oriented vertically to the faces of the substrates 11 and 21 as shown in FIG. 15B. At this point, a liquid crystal molecule 30a in contact with the vertical alignment layer (not shown) formed on the side face 40s of the protrusion 40 is oriented vertically to the side face 40s, and a liquid crystal molecule 30a in the vicinity of the side face 40s is oriented to be inclined as shown in the drawing due to the interaction (property as an elastic substance) with liquid crystal molecules 30a around.

When a voltage is applied through the liquid crystal layer 30, potential gradient expressed by the equipotential line EQ of FIG. 17A is formed. The equipotential line EQ is parallel to the faces of the solid portion 14b and the counter electrode 22 within a region of the liquid crystal layer 30 positioned between the solid portion 14b of the picture element electrode 14 and the counter electrode 22 and drops in a region corresponding to the opening 14a of the picture element electrode 14, and an inclined electric field expressed by an oblique portion of the equipotential line EQ is formed in a region of the liquid crystal layer 30 at the edge portion of the opening 14a (the inside periphery of the opening 14a including the boundary).

Owing to this inclined electric field, a liquid crystal molecule 30a positioned on the edge portion EG is inclined (rotated) in the clockwise direction at the edge portion EG on the right hand side in the drawing and in the counter-clockwise direction at the edge portion EG on the left hand side in the drawing as described above, so as to align parallel to the equipotential line EQ. The orientation-regulating direction obtained by this inclined electric fields accords with the orientation-regulating direction obtained by the side face 40*s* positioned at each edge portion EG.

As described above, when the change of the orientation starting from the liquid crystal molecules 30*a* positioned on the oblique portions of the equipotential line EQ is proceeded to attain the stationary state, the orientation state schematically shown in FIG. 17B is obtained. The liquid crystal molecules 30*a* positioned in the vicinity of the center of the opening 14*a*, namely, in the vicinity of the center of the top face 40*t* of the protrusion 40, are affected substantially equally by the orientations of the liquid crystal molecules 30*a* positioned at the opposing edge portions EG of the opening 14*a*, and hence keep the orientation vertical to the equipotential line EQ. The liquid crystal molecules 30*a* positioned away from the center of the opening 14*a* (namely, the top face 40*t* of the protrusion 40) are inclined due to the influence of the orientation of the liquid crystal molecules 30*a* positioned at the closer edge portion EG, so as to form the inclined orientation symmetrical about the center SA of the opening 14*a* (the top face 40*t* of the protrusion 40). Also, in a region corresponding to the unit solid portion 14*b*' substantially surrounded by the openings 14*a* and the protrusion 40, the inclined orientation symmetrical about the center SA of the unit solid portion 14*b*' is formed.

In this manner, also in the liquid crystal display device 200', liquid crystal domains having the radially-inclined orientation are formed correspondingly to the openings 14*a* and the unit solid portions 14*b*' in the same manner as in the liquid crystal display device 200 of Embodiment 2. Since the protrusion 40 is formed so as to completely surround the unit solid portion 14*b*' substantially circularly, a liquid crystal domain is formed correspondingly to the substantially circular region surrounded by the protrusion 40. Furthermore, the side face of the protrusion 40 formed within the opening 14*a* works to incline the liquid crystal molecules 30*a* positioned in the vicinity of the edge portion EG of the opening 14*a* in the same direction as the orientation direction caused by the inclined electric fields, resulting in stabilizing the radially-inclined orientation.

Naturally, the orientation-regulating force obtained by the inclined electric fields works merely under application of voltage and depends upon the magnitude of the electric field (i.e., the magnitude of the applied voltage). Accordingly, when the electric field has small magnitude (namely, when the applied voltage is low), the orientation-regulating force by the inclined electric field is weak, and hence, the radially-inclined orientation may be destroyed due to floating of the liquid crystal material when an external force is applied to the liquid crystal panel. Once the radially-inclined orientation is destroyed, the radially-inclined orientation cannot be restored until a voltage sufficiently high for generating the inclined electric fields exhibiting sufficiently strong orientation-regulating force is applied. In contrast, the orientation-regulating force by the side face 40*s* of the protrusion 40 works regardless of the applied voltage and is very strong as is known as an anchoring effect of an alignment layer. Accordingly, even when the radially-inclined orientation is once destroyed due to the floating of the liquid crystal material, the liquid crystal molecules 30*a* positioned in the vicinity of the side face 40*s* of the protrusion 40 keep their orientation directions the same as those in the radially-inclined orientation. Therefore, the radially-inclined orientation can be easily restored when the floating of the liquid crystal material is stopped.

In this manner, the liquid crystal display device 200' according to a modification of Embodiment 2 has not only the same characteristic as that of the liquid crystal display device 200 of Embodiment 2 but also a characteristic of high resistance against an external force. Accordingly, the liquid crystal display device 200' is suitably used in a PC or PDA generally used as portable equipment to which an external force is frequently applied.

When the protrusion 40 is formed from a dielectric substance with high transparency, the protrusion 40 can advantageously increase the contribution to display of a liquid crystal domain formed correspondingly to the opening 14*a*. On the other hand, when the protrusion 40 is formed from an opaque dielectric substance, light leakage derived from retardation of the liquid crystal molecules 30*a* oriented to be inclined owing to the side face 40*s* of the protrusion 40 can be advantageously prevented. It can be determined depending upon the application of the liquid crystal display device which type of dielectric substance is used. In either case, when the dielectric substance is a photosensitive resign, step of patterning the dielectric substance in accordance with the pattern of the openings 14*a* can be advantageously simplified. In order to attain a sufficient orientation-regulating force, the height of the protrusion 40 is preferably within a range between approximately 0.5 $\mu$m and approximately 2 $\mu$m when the liquid crystal layer 30 has a thickness of approximately 3 $\mu$m. In general, the height of the protrusion 40 is preferably in a range between approximately ⅙ through approximately ⅔ of the thickness of the liquid crystal layer 30.

As described above, the liquid crystal display device 200' includes the protrusion 40 within the opening 14*a* of the picture element electrode 14, and the side face 40*s* of the protrusion 40 has the control force for orienting the liquid crystal molecules 30*a* of the liquid crystal layer 30 in the same direction as the orientation-regulating direction obtained by the inclined electric fields. Preferable conditions for the side face 40*s* to attain the orientation-regulating force in the same direction as the orientation-regulating direction of the inclined electric fields will now be described with reference to FIGS. 18A, 18B and 18C.

Figure 18A:
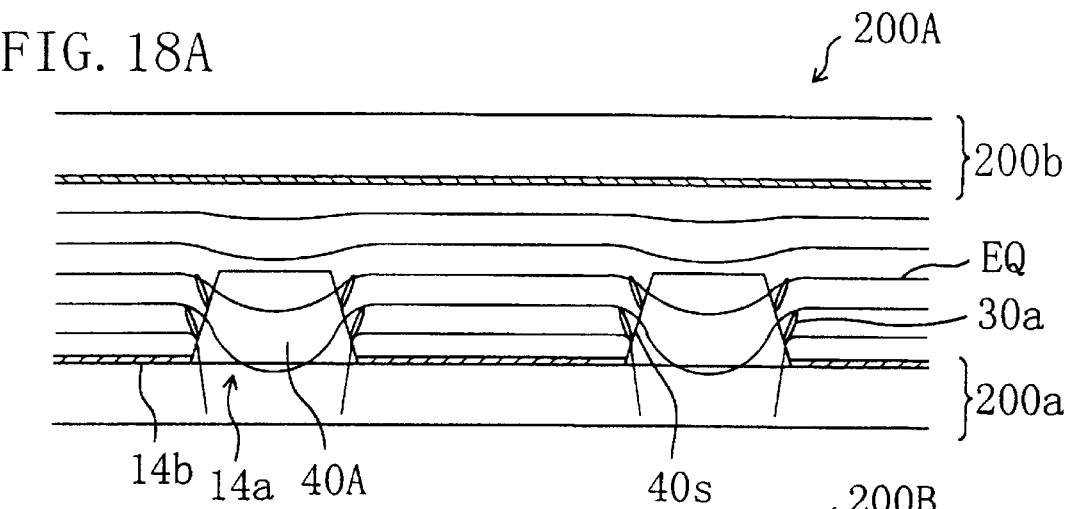
FIGS. 18A, 18B and 18C are schematic cross-sectional views of liquid crystal display devices 200A, 200B and 200C of Embodiment 2 that are different from one another in the arrangement relationship between an opening and a protrusion.
Figure 18B:
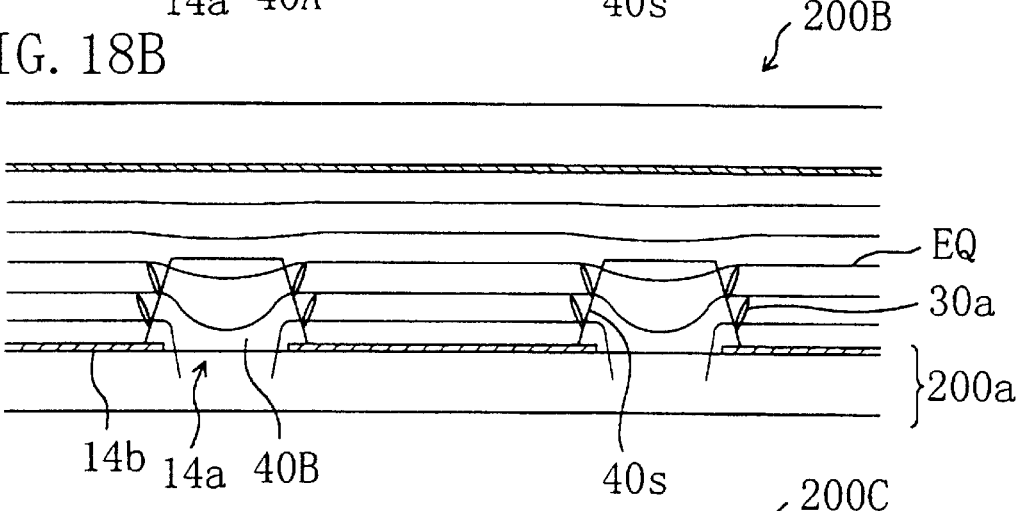
Figure 18C:
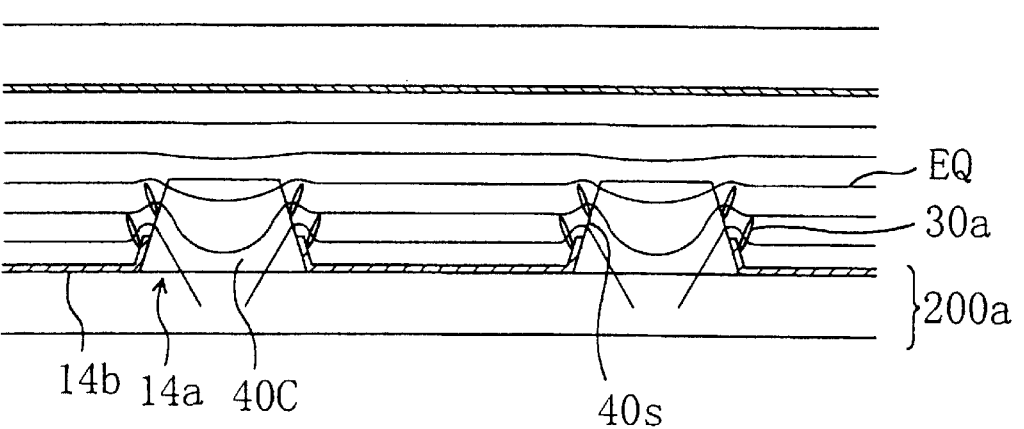

FIGS. 18A, 18B and 18C are schematic cross-sectional views of liquid crystal display devices 200A, 200B and 200C, respectively, all of which correspond to FIG. 17A. All of the liquid crystal display devices 200A, 200B and 200C have protrusions within openings 14*a* and are different from the liquid crystal display device 200' in the positional relationship between the entire protrusion 40 as a single structure and the opening 14*a*.

In the aforementioned liquid crystal display device 200', the entire protrusion 40 as a single structure is formed within the opening 14*a* and the bottom of the protrusion 40 is smaller than the opening 14*a* as shown in FIG. 17A. In the liquid crystal display device 200A of FIG. 18A, the bottom of the protrusion 40A accords with the opening 14*a*, and in the liquid crystal display device 200B of FIG. 18B, the protrusion 40B has a bottom larger than the opening 14*a* so that the protrusion 40B covers a part of the solid portion (conducting film) 14*b* around the opening 14*a*. In each of the protrusions 40, 40A and 40B, the solid portion 14*b* is not formed on the side face 40*s*. As a result, the equipotential line EQ is substantially flat on the solid portion 14*b* and drops in the opening 14*a* as shown in the respective drawings. Accordingly, the side face 40*s* of each of the protrusions 40A and 40B of the liquid crystal display devices 200A and 200B can exhibit the orientation-regulating force in the same direction as the orientation-regulating direction of the inclined electric fields similarly to the protrusion 40 of the liquid crystal display device 200', so as to stabilize the radially-inclined orientation.

In contrast, the bottom of the protrusion 40C of the liquid crystal display device 200C of FIG. 18C is larger than the opening 14a, and a part of the solid portion 14b around the opening 14a is formed on the side face 40s of the protrusion 40C. Owing to the solid portion 14b formed on the side face 40s, a crest is formed in the equipotential line EQ. The crest of the equipotential line EQ has a gradient reverse to that of the equipotential line EQ dropping in the opening 14a, which means that an inclined electric field is generated in the reverse direction to the inclined electric fields for orienting the liquid crystal molecules 30a to be radially inclined. Accordingly, in order to attain the side face 40s exhibiting the orientation-regulating force in the same direction as the orientation-regulating direction of the inclined electric fields, it is preferred that the solid portion (conducting film) 14b is not formed on the side face 40s.

Figure 19A:
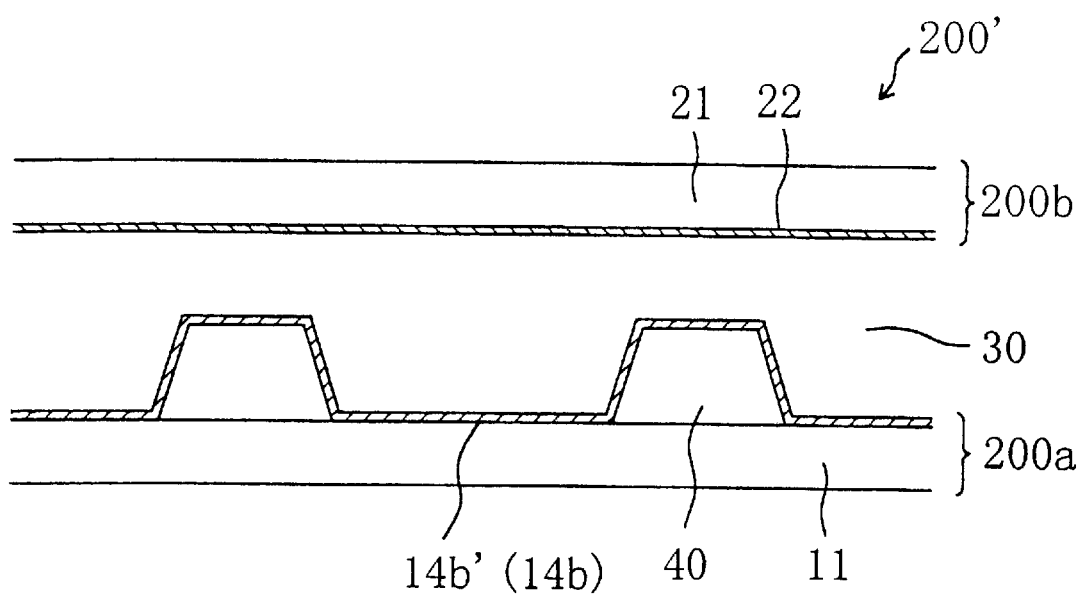
FIG. 19 is a schematic cross-sectional view of the liquid crystal display device 200' taken along line 19A–19A' of FIG. 15A.

Next, the cross-sectional structure of the protrusion 40 taken along line 18A–18A' of FIG. 15A will be described with reference to FIG. 19.

Since the protrusion 40 of FIG. 15A is formed so as to completely surround the unit solid portion 14b' substantially circularly as described above, the portions for mutually connecting the adjacent unit solid portions 14b' (the branch portions extending in the four directions from the circular portion) are formed on the protrusion 40 as shown in FIG. 17. Accordingly, there is a risk of disconnection caused on the protrusion 40 in depositing the conducting film for forming the solid portion 14b of the picture element electrode 14, or peeling may be highly probably caused in a subsequent step of the fabrication process.

Figure 20A:
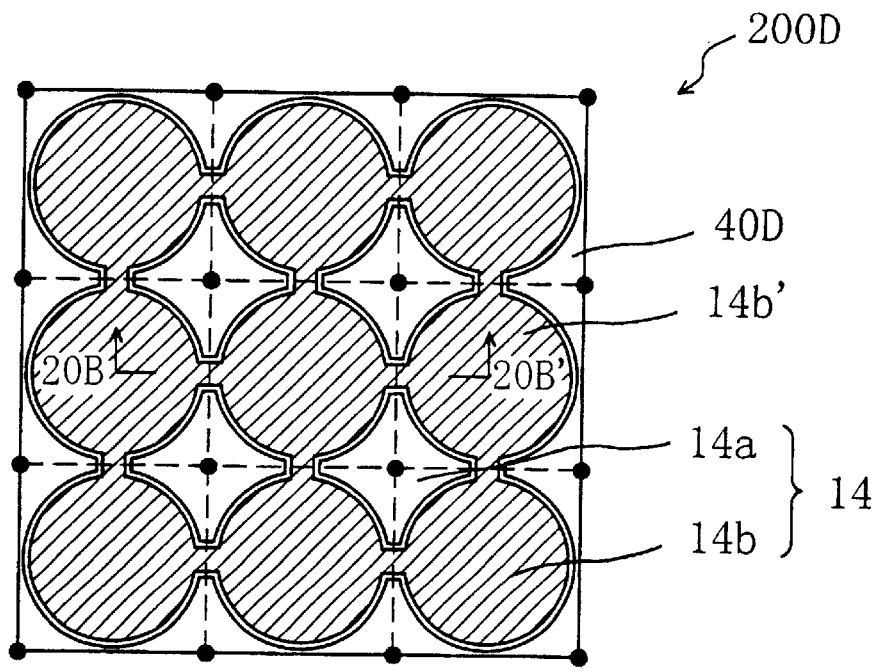
FIG. 20A is a top view for schematically showing the structure of one picture element region of a liquid crystal display device 200D according to Embodiment 2 of the invention and FIG. 20B is a cross-sectional view taken along line 20B–20B' of FIG. 20A.
Figure 20B:
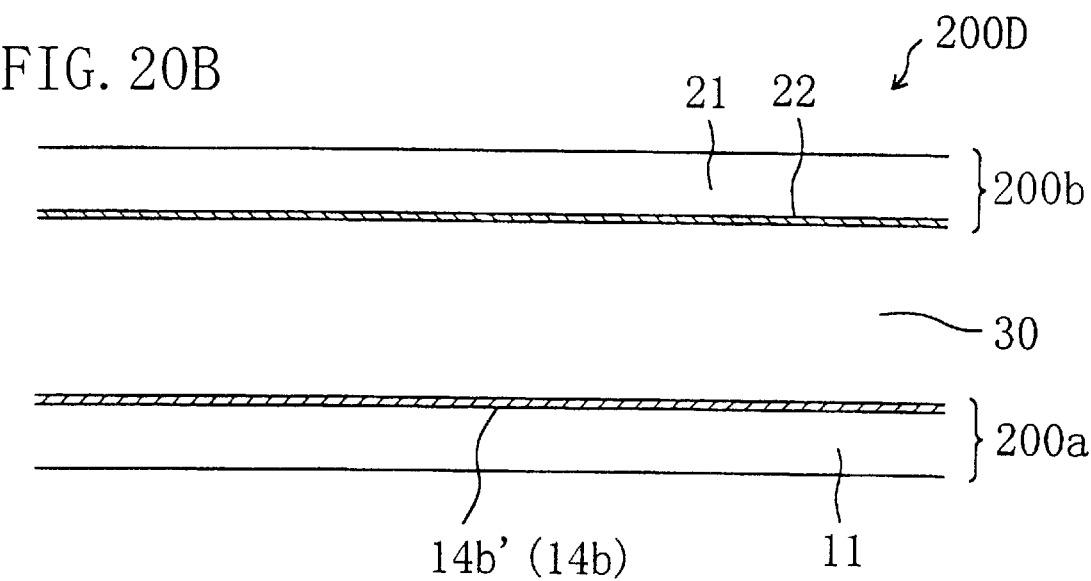

Therefore, as in a liquid crystal display device 200D shown in FIGS. 20A and 20B, an independent protrusion 40D is formed to be completely contained within the opening 14a. Thus, the conducting film for forming the solid portion 14b is formed on the flat face of the substrate 11, and hence, the risk of disconnection and peeling can be avoided. Although the protrusion 40D is not formed so as to completely surround the unit solid portion 14b' substantially circularly, a liquid crystal domain in the substantially circular shape is formed correspondingly to the unit solid portion 14b', so as to stabilize the radially-inclined orientation similarly to the aforementioned liquid crystal display device.

The effect to stabilize the radially-inclined orientation by forming the protrusion 40 in the opening 14a is exhibited not only in the opening 14a having the aforementioned pattern but also in the opening 14a having any of the patterns described in Embodiment 2, and the same effect can be attained in employing any of the patterns. In order to sufficiently exhibit the effect to stabilize the radially-inclined orientation against an external force by the protrusion 40, the pattern (seen from the substrate normal direction) of the protrusion 40 preferably has a shape for surrounding a region of the liquid crystal layer 30 as large as possible. Accordingly, the effect to stabilize the orientation by the protrusion 40 can be more remarkably exhibited in a positive pattern, for example, having a circular unit solid portion 14b' than in a negative pattern having a circular opening 14a.

(Arrangement of Polarizing Plate and Phase Plate)

In the so-called vertical orientation type liquid crystal display device including a liquid crystal layer in which liquid crystal molecules having the negative dielectric anisotropy are vertically oriented under application of no voltage, a display can be produced in a variety of display modes. For example, not only a birefringence mode for producing a display by controlling the birefringence of the liquid crystal layer with an electric field but also an optical rotating mode and a combination of the optical rotating mode and the birefringence mode can be employed as the display mode. When a pair of polarizing plates are provided on the outside (on the faces not facing the liquid crystal layer 30) of the pair of substrates (for example, the TFT substrate and the counter substrate) in any of the liquid crystal display devices described in Embodiments 1 and 2, a liquid crystal display device of the birefringence mode can be obtained. Also, a phase compensating device (typically, a phase plate) may be provided if necessary. Furthermore, a liquid crystal display device capable of bright display can be obtained by using substantially circularly polarized light.

Embodiment 3

Figure 21:
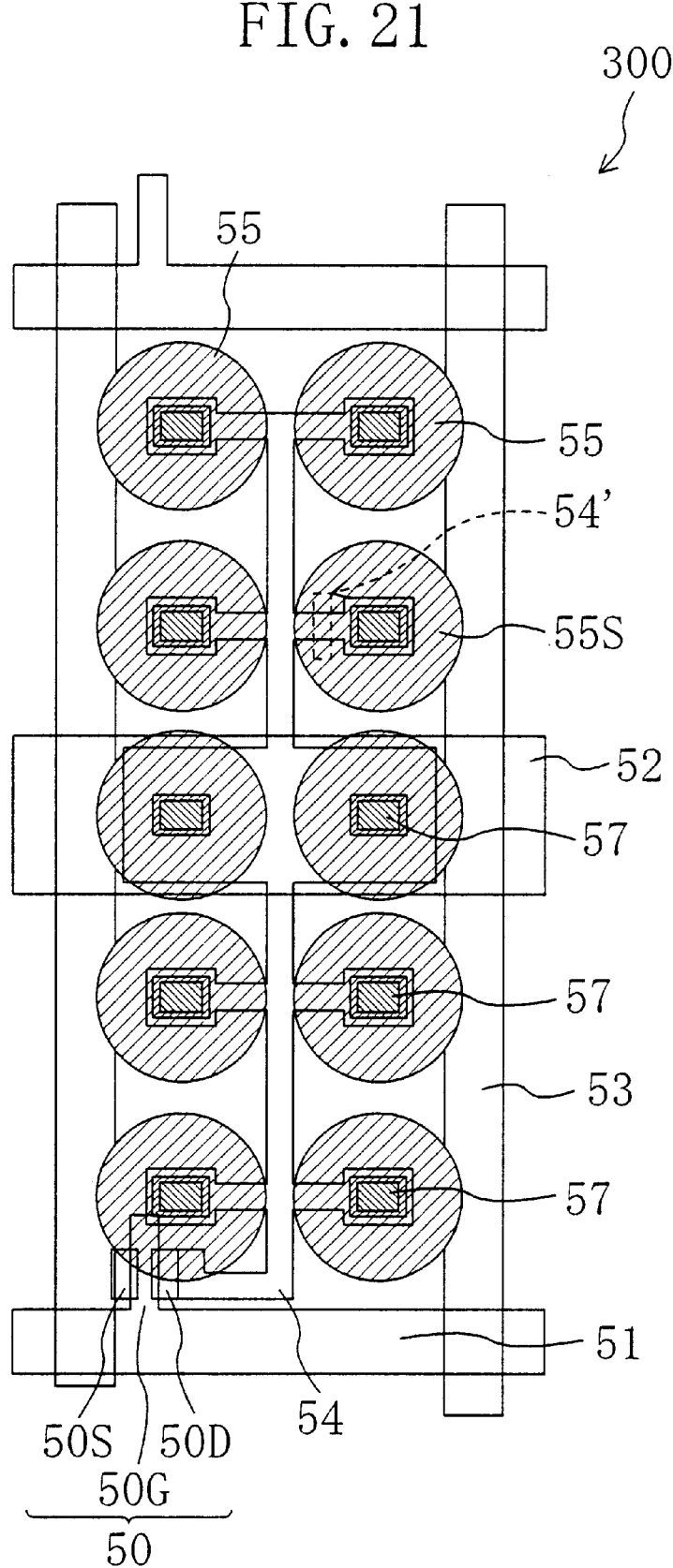
FIG. 21 is a top view for schematically showing the structure of one picture element region of a liquid crystal display device 300 according to Embodiment 3 of the invention.

A liquid crystal display device 300 according to Embodiment 3 of the invention will now be described with reference to FIG. 21. FIG. 21 is a top view for schematically showing one picture element region of the liquid crystal display device 300 of this embodiment. FIG. 21 mainly shows the structure of a picture element electrode with part of the other composing elements omitted. The liquid crystal display device 300 includes an active matrix substrate, a counter substrate and a liquid crystal layer disposed therebetween.

The active matrix substrate includes a transparent substrate (such as a glass substrate), a picture element electrode 14 provided in each picture element region on the face of the transparent substrate facing the liquid crystal layer and a TFT (thin film transistor) 50 serving as a switching element electrically connected to the picture element electrode 14. The counter substrate includes a transparent substrate (such as a glass substrate) and a counter electrode provided thereon.

The picture element electrode 14 and the counter electrode are disposed so as to oppose each other with the liquid crystal layer sandwiched therebetween, and the orientation state of the liquid crystal layer in each picture element region is changed in accordance with a voltage applied between the picture element electrode 14 and the counter electrode.

The structure of the active matrix substrate of the liquid crystal display device 300 will now be described in more detail with reference to FIG. 21.

The active matrix substrate includes the insulating substrate, on which a scanning line (gate bus line) 51, a gate electrode 50G branched from the scanning line 51 and an storage capacitance line 52 are formed. A gate insulating film is formed so as to cover them. A semiconductor layer, a channel protection layer, a source electrode 50S and a drain electrode 50D are formed on the gate insulating film above the gate electrode 50G, so as to form the TFT 50.

The source electrode 50S of the TFT 50 is electrically connected to a signal line (source bus line) 53 and the drain electrode 50G thereof is electrically connected to a connection line 54. An interlayer insulating film is formed so as to cover the entire face of the insulating substrate where the TFT 50 is formed, and the picture element electrode 14 is formed on the interlayer insulating film.

The picture element electrode 14 includes a plurality of sub-picture element electrodes 55, which are electrically connected to the TFT 50 in parallel. Each of the sub-picture element electrodes 55 of this embodiment is in a circular shape, which does not limit the invention. The sub-picture element electrode 55 may be in any optional shape including a rectangular shape. Also, the picture element electrode 14 includes ten sub-picture element electrodes 55 in this embodiment, which does not limit the invention. The picture element electrode 14 may include an optional number of sub-picture element electrodes 55, and the sizes (areas) of the respective sub-picture element electrodes 55 may be different.

Each sub-picture element electrode 55 is electrically connected to the connection line 54 through a contact hole 57 formed in the interlayer insulating film and is electrically connected to the drain electrode 50D through the connection line 54.

As described above, the plurality of sub-picture element electrodes 55 of the picture element electrode 14 are electrically connected to the TFT 50 in parallel in the liquid crystal display device 300 of this embodiment. Accordingly, in the case where short-circuit is caused between a given sub-picture element electrode 55 and the counter electrode, merely the sub-picture element electrode 55 suffering from the short-circuit defect can-be electrically disconnected from the TFT 50 with keeping the electrical connection between the other sub-picture element electrodes 55 and the TFT 50. Therefore, a normal voltage is applied through the TFT 50 to the other sub-picture element electrodes 55, so as to attain sufficient display quality.

For example, in the case where a short-circuit defect is caused in a sub-picture element electrode 55s disposed on the second row and in the second column in FIG. 21, merely the sub-picture element electrode 55s suffering from the short-circuit defect can be electrically disconnected from the TFT 50 with keeping the electrical connection between the other sub-picture element electrodes 55 and the TFT 50 by cutting off the connection line 54 at a disconnection portion 54' shown in the drawing.

Figure 22:
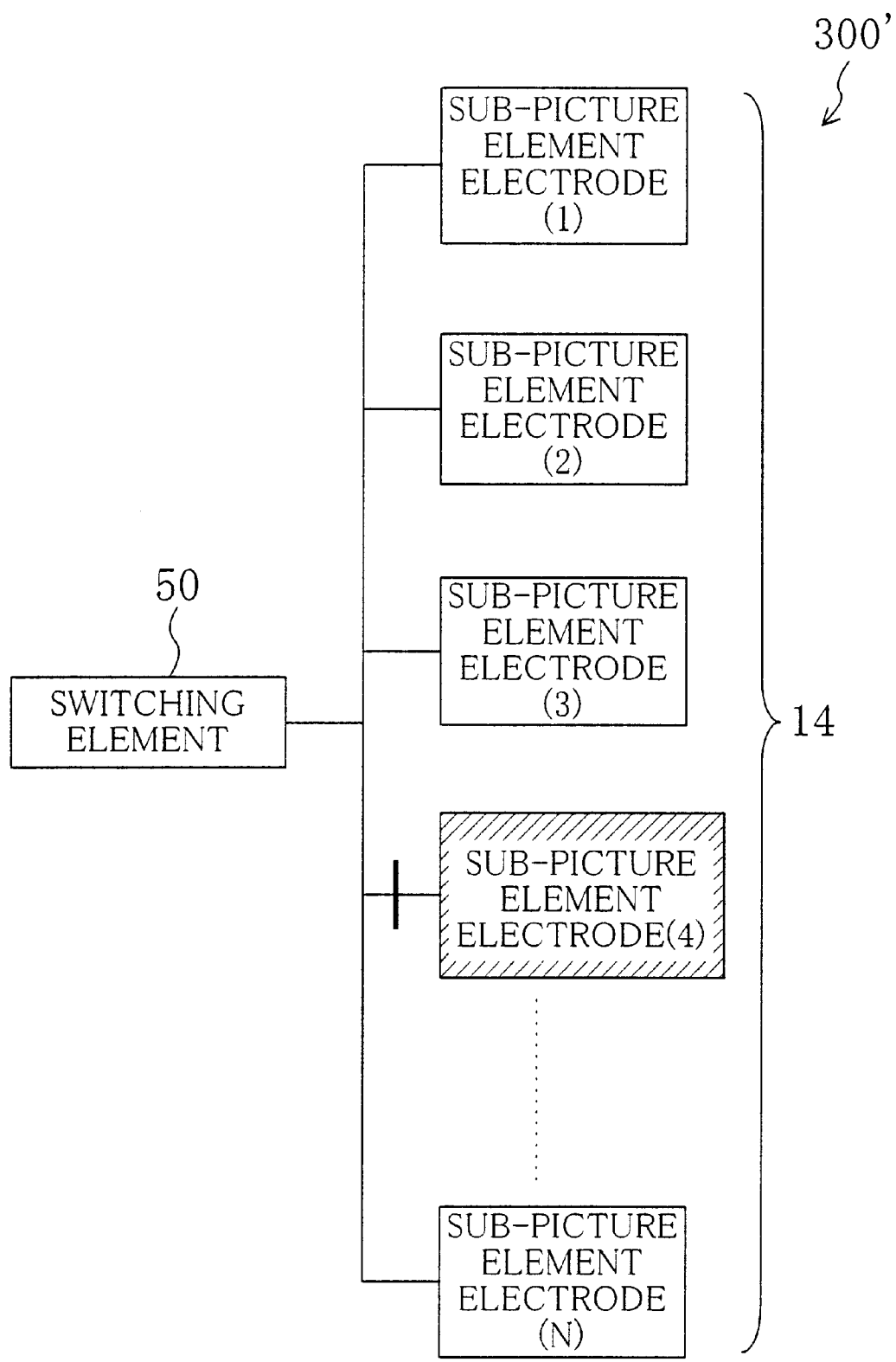
FIG. 22 is a conceptual diagram of a liquid crystal display device 300' including a picture element electrode 14 having a plurality of sub-picture element electrodes electrically connected to a switching element 50 in parallel.

FIG. 22 is a conceptual diagram of a liquid crystal display device 300' including a picture element electrode 14 having a plurality of sub-picture element electrodes electrically connected to a switching element 50 in parallel.

The picture element electrode 14 of the liquid crystal display device 300' includes N sub-picture element electrodes (1) through (N). In FIG. 22, a solid line extending between the switching element 50 and each of the sub-picture element electrodes or between the sub-picture element electrodes denotes that they are electrically connected to each other.

In the liquid crystal display device 300', the sub-picture element electrodes (1) through (N) are electrically connected to the switching element 50 in parallel. Therefore, even when a short-circuit defect is caused in any of the sub-picture element electrodes, the sub-picture element electrode suffering from the short-circuit defect alone can be electrically disconnected from the switching element 50 with keeping the electrical connection between the other sub-picture element electrodes and the switching element 50.

For example, in the case where short-circuit is caused in the hatched sub-picture element electrode (4) of FIG. 22, the sub-picture element electrode (4) alone can be electrically disconnected from the switching element 50 by cutting off the electrical connection between the sub-picture element electrode (4) and the switching element 50. Accordingly, after the repairing, all the other sub-picture element electrodes can make contribution to display, resulting in realizing display with high quality.

The defect repairing in the liquid crystal display device 300 of this embodiment is specifically carried out, for example, as follows:

First, a picture element region having a display defect is specified among a plurality of picture element regions, and in the specified picture element region, a sub-picture element electrode 55s suffering from short-circuit is specified among a plurality of sub-picture element electrodes 55. The specification of the picture element region and the sub-picture element electrode 55s is executed by using, for example, an optical microscope or a magnifying lens.

Next, the specified sub-picture element electrode 55s is electrically disconnected from a TFT 50 by cutting off, for example, a part of the connection line 54. The connection line 54 is cut off by, for example, irradiating with a laser beam. The cutting by using a laser beam can be appropriately executed by known technique.

The liquid crystal display device 300 of this embodiment may be fabricated by any of the known fabrication methods.

The liquid crystal display device 300 may have a structure capable of the TN mode display like the liquid crystal display device 100 of Embodiment 1. Also, when the liquid crystal display device 300 has the electrode structure where the liquid crystal layer is placed in the radially-inclined orientation state as in the liquid crystal display device 200 of Embodiment 2, a region of the liquid crystal layer corresponding to each opening 14a of the picture element electrode 14 can make contribution to display, and hence, bright display can be realized.

In this manner, the present invention provides a liquid crystal display device capable of repairing a display defect caused due to a short-circuit defect through a picture element electrode without sacrificing the entire picture element suffering from the display defect, and a defect repairing method employed in the liquid crystal display device.

What is claimed is:

1. A liquid crystal display device comprising:

a first substrate;

a second substrate;

a liquid crystal layer disposed between the first substrate and the second substrate;

a plurality of picture element regions for producing a display;

in at least one of the plurality of picture element regions, a picture element electrode supported by the first substrate facing the liquid crystal layer and a switching element electrically connected to the picture element electrode, wherein the picture element electrode includes a plurality of sub-picture element electrodes and a plurality of contact portions each for mutually electrically connecting at least some of the sub-picture element electrodes, and wherein, during display operation, at least one of the plurality of sub-picture element electrodes is electrically connected to the switching element via a plurality of connection paths.

2. The display device of claim 1, wherein only a single switching element is provided for the picture element region in which the picture element electrode is located.

3. The display device of claim 1, wherein the contact portions and at least one of the sub-picture element electrodes are formed of the same material so as to be planar with one another.

4. The display device of claim 1, wherein at least three different sub-picture element electrodes are provided in the picture element region.

5. The display device of claim 1, wherein in the picture element region the liquid crystal layer is formed into a plurality of liquid crystal domains each in a radially-inclined orientation state by inclined electric fields generated at respective edge portions of openings of the picture element electrode when a voltage is applied between the picture element electrode and a counter electrode.

6. A liquid crystal display device comprising:
a first substrate;
a second substrate;
a liquid crystal layer disposed between the first substrate and the second substrate;
a plurality of picture element regions for producing a display;
in at least one of the picture element regions, a picture element electrode supported by the first substrate facing the liquid crystal layer and a switching element electrically connected to the picture element electrode;
wherein the picture element electrode includes a plurality of sub-picture element electrodes and a plurality of contact portions each for mutually electrically connecting at least some of the sub-picture element electrodes;
wherein at least one of the plurality of sub-picture element electrodes is electrically connected to the switching element via a plurality of connection paths;
a counter electrode supported by the second substrate and opposing the picture element electrode with the liquid crystal layer sandwiched therebetween,
wherein the picture element electrode comprises a solid portion including the plurality of sub-picture element electrodes and the plurality of contact portions, and a plurality of openings, and
wherein in the picture element region the liquid crystal layer is formed into a plurality of liquid crystal domains each in a radially-inclined orientation state corresponding to the plurality of openings and the solid portion by in lined electric fields generated at respective edge portions of the plurality of openings of the picture element electrode when a voltage is applied between the picture element electrode and the counter electrode, thereby changing orientation states of the plurality of liquid crystal domains in accordance with the applied voltage.

7. The liquid crystal display device of claim 6,
wherein at least some of the plurality of openings have substantially the same shape and the same size, and form at least one unit lattice arranged so as to have rotational symmetry.

8. The liquid crystal display device of claim 7,
wherein each of the at least some of the plurality of openings is in a rotationally symmetrical shape.

9. The liquid crystal display device of claim 7,
wherein each of the at least some of the plurality of openings is in a substantially circular shape.

10. The liquid crystal display device of claim 7,
wherein each region of the solid portion surrounded with the at least some of the plurality of openings is in a substantially circular shape.

11. The liquid crystal display device of claim 6,
wherein, in each of the plurality of picture element regions, a total area of the plurality of openings of the picture element electrode is smaller than an area of the solid portion of the picture element electrode.

12. The liquid crystal display device of claim 6, further comprising a protrusion within each of the plurality of openings,
wherein a cross-sectional shape of the protrusion taken in a plane direction of the substrate is the same as a shape of the corresponding opening, and a side face of the protrusion has orientation-regulating force for orienting liquid crystal molecules of the liquid crystal layer in the same direction as an orientation-regulating direction obtained by the inclined electric fields.

13. A liquid crystal display comprising:
a first substrate;
a second substrate;
a liquid crystal layer disposed between the first substrate and the second substrate;
a plurality of picture element regions for producing a display;
in at least one of the plurality of picture element regions, a picture element electrode supported by the first substrate and facing the liquid crystal layer and a switching element electrically connected to the picture element electrode;
wherein the picture element electrode includes a plurality of sub-picture element electrodes electrically connected to the switching element in parallel;
a counter electrode supported by the second substrate and opposing the picture element electrode with the liquid crystal layer sandwiched therebetween,
wherein the picture element electrode comprises a solid portion including the plurality of sub-picture element electrodes and the plurality of contact portions, and a plurality of openings, and
wherein in the picture element region the liquid crystal layer is formed into a plurality of liquid crystal domains each in a radially-inclined orientation state corresponding to the plurality of openings and the solid portion by inclined electric fields generated at respective edge portions of the plurality of openings of the picture element electrode when a voltage is applied between the picture element electrode and the counter electrode, thereby changing orientation states of the plurality of liquid crystal domains in accordance with the applied voltage.

14. The liquid crysal display of claim 13, wherein at least some of the plurality of openings have substantially the same shape and same size, and form at least one unit lattice arranged so as to have rotational symmetry.

15. The liquid crystal display of claim 14, wherein each of the at least some of the plurality of openings is in a rotationally symmetrical shape.

16. The liquid crystal display of claim 14, wherein each of the at least some of the plurality of openings is substantially circular in shape.

17. The liquid crystal display of claim 14, wherein each region of the solid portion surrounded with the at least some of the plurality of openings is substantially circular in shape.

18. The liquid crystal display of claim 13, wherein, in the at least one picture element region, a total area of the plurality of openings of the picture element electrode is smaller than an area of the solid portion of the picture element electrode.

19. The liquid crystal display of claim 13, further comprising:
a protrusion in at least one of the plurality of openings;
wherein a cross sectional shape of the protrusion taken in a plane direction of the substrate is the same as a shape of the opening; and
a side face of the protrusion has orientation-regulating force for orienting liquid crystal molecules of the liquid crystal layer in the same direction as an orientation-regulating direction obtained by the inclined electric fields.

20. The liquid crystal display of claim 19, wherein one of the protrusions is provided in each of the plurality of openings.

21. A liquid crystal display comprising:

a liquid crystal layer provided between at least first and second substrates;

a pixel electrode supported by one of the substrates, wherein the pixel electrode comprises a plurality of sub-pixel element electrodes electrically connected to one another via conductive contact portions;

wherein the pixel electrode is in communication with only a single switching element; and wherein, during display operation, at least one of the sub-pixel element electrodes is electrically connected to the single switching element via at least first and second different paths which extend through at least first and second different contact portions, respectively.

22. The display device of claim 21, wherein the contact portions and at least one of the sub-pixel element electrodes are formed so as to be planar with one another.

23. The display device of claim 21, wherein at least three different sub-pixel element electrodes are provided in a picture element region.

24. The display device of claim 21, wherein in a picture element region including the pixel electrode, the liquid crystal layer is formed into a plurality of liquid crystal domains each in a radially-inclined orientation state by inclined electric fields generated at respective edge portions of openings of the pixel electrode when a voltage is applied between the pixel electrode and a counter electrode.

25. The display of claim 24, wherein each domain comprises liquid crystal molecules axially symmetrically aligned when a voltage is applied between the pixel electrode and the counter electrode.

26. A liquid crystal display device comprising:

a first substrate;

a second substrate;

a liquid crystal layer disposed between the first substrate and the second substrate;

a plurality of picture element regions for producing a display;

in at least one of the plurality of picture element regions, a picture element electrode supported by the first substrate;

a switching element electrically connected to the picture element electrode, wherein the picture element electrode includes a plurality of sub-picture element electrodes; and wherein, during display operation, at least one of the plurality of sub-picture element electrodes is coupled to the switching element via a plurality of different paths.

* * * * *